(12) United States Patent
Smolyakov et al.

(10) Patent No.: US 12,013,468 B2
(45) Date of Patent: Jun. 18, 2024

(54) SYSTEM AND METHOD FOR DETERMINING GNSS CORRECTIONS

(71) Applicant: Swift Navigation, Inc., San Francisco, CA (US)

(72) Inventors: Ivan Smolyakov, San Francisco, CA (US); Sébastien Carcanague, San Francisco, CA (US); Joseph Angelo, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 18/241,542

(22) Filed: Sep. 1, 2023

(65) Prior Publication Data

US 2024/0077620 A1 Mar. 7, 2024

Related U.S. Application Data

(60) Provisional application No. 63/403,212, filed on Sep. 1, 2022, provisional application No. 63/404,301, filed on Sep. 7, 2022.

(51) Int. Cl.
*G01S 19/07* (2010.01)
*G01S 19/32* (2010.01)
*G01S 19/44* (2010.01)

(52) U.S. Cl.
CPC .......... *G01S 19/071* (2019.08); *G01S 19/32* (2013.01); *G01S 19/44* (2013.01); *G01S 19/072* (2019.08)

(58) Field of Classification Search
CPC ...... G01S 19/071; G01S 19/072; G01S 19/32; G01S 19/43; G01S 19/44
See application file for complete search history.

(56) References Cited

U.S. PATENT DOCUMENTS

| 5,490,076 A | 2/1996 | Rawicz et al. |
|---|---|---|
| 5,610,614 A | 3/1997 | Talbot et al. |
| 6,427,122 B1 | 7/2002 | Lin |

(Continued)

FOREIGN PATENT DOCUMENTS

| CA | 2718988 C | 1/2014 |
|---|---|---|
| CA | 3079279 A1 | 10/2020 |

(Continued)

OTHER PUBLICATIONS

Y. Yang et al., L1 Backup Navigation for Dual Frequency GPS Receiver, Proceedings of the 16th International Technical Meeting of the Satellite Division of The Institute of Navigation (ION GPS/GNSS 2003), p. 1258-1263 (Year: 2003).*

(Continued)

*Primary Examiner* — Bernarr E Gregory
*Assistant Examiner* — Fred H Mull
(74) *Attorney, Agent, or Firm* — Jeffrey Schox; Randy Mehlenbacher

(57) ABSTRACT

A system can include (and/or receive data from) one or more data sources (e.g., satellites, reference stations, etc.), a computing system (e.g., a corrections generator thereof), a GNSS receiver, one or more sensors, and/or any suitable component(s). A method can include receiving satellite observations at a first signal frequency, determining GNSS corrections for a second signal frequency, determining a GNSS receiver position based on the GNSS corrections, and/or any suitable step(s).

23 Claims, 6 Drawing Sheets

(56) References Cited

U.S. PATENT DOCUMENTS

| | | |
|---|---|---|
| 6,453,237 B1 | 9/2002 | Fuchs et al. |
| 6,552,680 B1 | 4/2003 | Barber et al. |
| 6,647,340 B1 | 11/2003 | Pemble et al. |
| 6,691,066 B1 | 2/2004 | Brodie |
| 6,816,117 B2 | 11/2004 | Fink et al. |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,298,325 B2 | 11/2007 | Krikorian et al. |
| 7,382,313 B1 | 6/2008 | Goad |
| 7,409,289 B2 | 8/2008 | Coatantiec et al. |
| 7,538,721 B2 | 5/2009 | Vollath et al. |
| 7,692,578 B2 | 4/2010 | Vollath et al. |
| 7,696,922 B2 | 4/2010 | Nicholson et al. |
| 8,089,402 B2 | 1/2012 | Maenpa et al. |
| 8,094,065 B2 | 1/2012 | Henkel |
| 8,134,497 B2 | 3/2012 | Janky et al. |
| 8,193,976 B2 | 6/2012 | Shen et al. |
| 8,255,155 B1 | 8/2012 | Crane et al. |
| 8,416,133 B2 | 4/2013 | Hatch et al. |
| 8,447,517 B2 | 5/2013 | Roh |
| 8,542,146 B2 | 9/2013 | Vollath |
| 8,587,475 B2 | 11/2013 | Leandro |
| 8,610,624 B2 | 12/2013 | Savoy |
| 8,756,001 B2 | 6/2014 | Georgy et al. |
| 8,760,343 B2 | 6/2014 | Milyutin et al. |
| 8,825,456 B2 | 9/2014 | Vasudevan et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,182,497 B2 | 11/2015 | Geier et al. |
| 9,405,012 B2 | 8/2016 | Doucet et al. |
| 9,405,016 B2 | 8/2016 | Yim |
| 9,417,330 B2 | 8/2016 | Revol et al. |
| 9,557,422 B1 | 1/2017 | Miller et al. |
| 9,568,321 B2 | 2/2017 | Bharadwaj et al. |
| 9,576,082 B2 | 2/2017 | Sparks et al. |
| 9,602,974 B2 | 3/2017 | Rudow et al. |
| 9,612,341 B2 | 4/2017 | Large et al. |
| 9,709,683 B2 | 7/2017 | Leandro et al. |
| 9,784,844 B2 | 10/2017 | Kana et al. |
| 9,857,474 B2 | 1/2018 | Tan et al. |
| 9,927,530 B2 | 3/2018 | Boyarski |
| 10,018,729 B2 | 7/2018 | Dunik et al. |
| 10,101,464 B2 | 10/2018 | Appleford et al. |
| 10,191,157 B2 | 1/2019 | Dai et al. |
| 10,260,888 B2 | 4/2019 | Takahashi |
| 10,274,606 B1 | 4/2019 | Phan et al. |
| 10,422,885 B2 | 9/2019 | Dai et al. |
| 10,459,593 B2 | 10/2019 | Tiwari et al. |
| 10,473,790 B2 | 11/2019 | Noble et al. |
| 10,578,747 B2 | 3/2020 | Grgich et al. |
| 10,677,933 B1 | 6/2020 | Gavrilets et al. |
| 10,802,160 B2 | 10/2020 | Dai et al. |
| 10,809,388 B1 | 10/2020 | Carcanague et al. |
| 10,901,096 B2 | 1/2021 | Thrasher et al. |
| 11,131,774 B2 | 9/2021 | Miya et al. |
| 11,143,762 B2 | 10/2021 | Takahashi et al. |
| 11,156,718 B2 | 10/2021 | Takeda |
| 11,187,813 B2 | 11/2021 | Brandl et al. |
| 11,221,418 B2 | 1/2022 | Sleewaegen et al. |
| 11,237,276 B2 | 2/2022 | Kleeman |
| 11,259,141 B2 | 2/2022 | Li et al. |
| 11,327,182 B2 | 5/2022 | Zalewski et al. |
| 11,333,772 B2 | 5/2022 | Del Regno et al. |
| 11,378,699 B2 | 7/2022 | Segal et al. |
| 11,422,269 B2 | 8/2022 | Ookubo et al. |
| 11,422,271 B2 | 8/2022 | Talbot et al. |
| 11,624,838 B2 | 4/2023 | Fine et al. |
| 11,693,120 B2 | 7/2023 | Angelo et al. |
| 11,953,608 B2 | 4/2024 | Hamada et al. |
| 2002/0180641 A1 | 12/2002 | Fink et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2005/0203702 A1 | 9/2005 | Sharpe et al. |
| 2007/0126629 A1 | 6/2007 | Krikorian et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0224969 A1 | 9/2009 | Kolb |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | McAree et al. |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0146847 A1 | 6/2012 | Janky et al. |
| 2012/0154210 A1 | 6/2012 | Landau et al. |
| 2012/0154214 A1 | 6/2012 | Leandro |
| 2012/0154215 A1 | 6/2012 | Vollath et al. |
| 2012/0173195 A1 | 7/2012 | Opshaug et al. |
| 2012/0176271 A1 | 7/2012 | Dai et al. |
| 2012/0286991 A1 | 11/2012 | Chen et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2013/0335264 A1 | 12/2013 | Revol et al. |
| 2014/0002300 A1 | 1/2014 | Leandro et al. |
| 2014/0015712 A1 | 1/2014 | Leandro et al. |
| 2014/0062765 A1 | 3/2014 | Brenner |
| 2014/0062776 A1 | 3/2014 | Ferguson et al. |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2014/0266876 A1 | 9/2014 | Tan et al. |
| 2014/0288825 A1 | 9/2014 | Czompo et al. |
| 2015/0019464 A1 | 1/2015 | Nguyen-Tuong et al. |
| 2015/0168559 A1 | 6/2015 | Salazar et al. |
| 2015/0173037 A1 | 6/2015 | Pijl |
| 2015/0260848 A1 | 9/2015 | Mundt et al. |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0116601 A1 | 4/2016 | Horn et al. |
| 2016/0195617 A1 | 7/2016 | Phatak et al. |
| 2017/0254904 A1* | 9/2017 | Zhodzishsky ........... G01S 19/04 |
| 2017/0269216 A1 | 9/2017 | Dai et al. |
| 2017/0269222 A1 | 9/2017 | Dai et al. |
| 2017/0269227 A1 | 9/2017 | Dai et al. |
| 2017/0269231 A1 | 9/2017 | Dai et al. |
| 2017/0299730 A1 | 10/2017 | Lie et al. |
| 2017/0299731 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0172838 A1 | 6/2018 | Junker et al. |
| 2018/0188032 A1 | 7/2018 | Ramanandan et al. |
| 2018/0246217 A1 | 8/2018 | Wuebbena |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0078895 A1 | 3/2019 | Ma et al. |

(56) References Cited

U.S. PATENT DOCUMENTS

| | | |
|---|---|---|
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0302274 A1 | 10/2019 | Berntorp et al. |
| 2019/0339396 A1 | 11/2019 | Turunen |
| 2019/0369265 A1 | 12/2019 | Jokinen |
| 2019/0383948 A1 | 12/2019 | Hoeferlin et al. |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0041658 A1 | 2/2020 | Laurichesse |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2020/0257002 A1 | 8/2020 | Henkel |
| 2020/0408926 A1 | 12/2020 | Carcanague et al. |
| 2021/0033735 A1 | 2/2021 | Kleeman |
| 2021/0116579 A1 | 4/2021 | Rezaei |
| 2021/0141099 A1 | 5/2021 | Gunnarsson et al. |
| 2021/0165104 A1 | 6/2021 | Zalewski et al. |
| 2021/0165111 A1 | 6/2021 | Zalewski |
| 2021/0215831 A1 | 7/2021 | Takeda |
| 2021/0333413 A1* | 10/2021 | Zyryanov ............. G01S 19/235 |
| 2021/0372793 A1 | 12/2021 | Nikulin et al. |
| 2022/0011443 A1 | 1/2022 | De Wilde et al. |
| 2022/0018969 A1 | 1/2022 | Fine et al. |
| 2022/0057523 A1 | 2/2022 | Lee |
| 2022/0058322 A1 | 2/2022 | Brandl et al. |
| 2022/0107427 A1 | 4/2022 | Kleeman et al. |
| 2022/0163677 A1 | 5/2022 | Muthuraman et al. |
| 2022/0171053 A1 | 6/2022 | Park et al. |
| 2022/0317310 A1 | 10/2022 | He et al. |
| 2023/0140535 A1 | 5/2023 | Ma et al. |
| 2023/0184956 A1 | 6/2023 | Cole et al. |

FOREIGN PATENT DOCUMENTS

| | | |
|---|---|---|
| CN | 101166995 A | 4/2008 |
| CN | 103197327 A | 7/2013 |
| CN | 103760573 A | 4/2014 |
| CN | 104236522 A | 12/2014 |
| CN | 104732085 A | 6/2015 |
| CN | 106338738 A | 1/2017 |
| CN | 106970404 A | 7/2017 |
| CN | 107085626 A | 8/2017 |
| CN | 105629263 B | 4/2019 |
| CN | 107422354 B | 6/2019 |
| CN | 111272174 A | 6/2020 |
| CN | 109714421 B | 8/2021 |
| CN | 114174850 A | 3/2022 |
| DE | 102017212603 A1 | 1/2019 |
| DE | 102018202223 A1 | 8/2019 |
| EP | 0244091 A2 | 11/1987 |
| EP | 1729145 A1 | 12/2006 |
| EP | 2128841 A1 | 12/2009 |
| EP | 2602752 A1 | 6/2013 |
| EP | 1839070 B2 | 4/2014 |
| EP | 2966477 A1 | 1/2016 |
| EP | 2995975 A1 | 3/2016 |
| EP | 3035080 A1 | 6/2016 |
| EP | 3627188 A1 | 3/2020 |
| EP | 3566021 B1 | 3/2021 |
| EP | 3828595 A1 | 6/2021 |
| EP | 3963352 A1 | 3/2022 |
| KR | 101181990 B1 | 9/2012 |
| WO | 02061449 A1 | 8/2002 |
| WO | 2017046914 A1 | 3/2017 |
| WO | 2017070732 A1 | 5/2017 |
| WO | 2018188845 A1 | 10/2018 |
| WO | WO-2019063645 A1 * | 4/2019 ............. G01C 21/20 |
| WO | 2020240307 A1 | 12/2020 |

OTHER PUBLICATIONS

M. F. Abdel-Hafez et al., A High-Integrity and Efficient GPS Integer Ambiguity Resolution Method, Navigation: Journal of The Institute of Navigation, vol. 50(4), p. 295-310, Winter 2003-2004 (Year: 2004).*

J.S. Subirana et al., Combination of GNSS Measurements, Navipedia, https://gssc.esa.int/navipedia/index.php?title=Combination_of_GNSS_Measurements (Year: 2011).*

M. Wang et al., GPS Un-Differenced Ambiguity Resolution and Validation, Proceedings of the 19th International Technical Meeting of the Satellite Divisionof The Institute of Navigation (ION GNSS 2006), p. 292-300 (Year: 2006).*

Bijl, Hildo , et al., "Online sparse Gaussian process regression using FITC and PITC approximations", IFAG-Papers On Line vol. 48, Issue 28, 2015, pp. 703-708 (Year: 2015).

Cole, D.A. , et al., "Locally induced Gaussian processes for large-scale simulation experiments", Stat Comput 31, 33 (2021). https://doi.org/10.1007/s11222-021-10007-9 (Year: 2021).

Erickson, Collin B., et al., "Comparison of Gaussian Process Modeling Software", European Journal of Operational Research 266 (2018) 179-192 (Year: 2018).

Inyurt, Samed , et al., "Ionospheric TEC Forecasting Using Gaussian Process Regression (GPR) and multiple Linear Regression (M LR) in X Turkey", Astrophys Space Sci (2020) 365:99, https://doi.org/10.1007/s10509-020-03817-2 (Year: 2020).

Lin, Ming , et al., "Robust Gaussian Process Regression for Real-Time High Precision GPS Signal Enhancement", Applied Data Science Track Paper. KDD '19, Aug. 4-8, 2019, Anchorage, AK, USA (Year: 2019).

Quinonero-Candel, Joaquin , et al., "A Unifying View of Sparse Approximate Gaussian Progress Regression", Journal of Machine Learning Research 6 (2005) 1939-1959. (Year: 2005).

Schmid, Ralf , et al., "From Relative Absolute Antenna Phase Center Corrections", Conference: IGS Workshop and Symposium 2004.

Schmid, Ralf , "How to Use IGS Antenna Phase Center Corrections", GPS World Tech Talk, Feb. 3, 2010.

Schmitz, Martin , "RTCM State Space Representation Messages, Status and Plans", PPP-RTK & Open Standards Symposium, Mar. 12-13, 2012, Frankfurt, Germany.

Shapiro, Larry S., et al., "Rejecting Outliers and Estimating Errors in an Orthogonal-Regression Framework", Phil. Trans. R. Soc. Load. A (1995)350, 407-439. (Year: 1995).

Skog, Isaac , et al., "A Low-Cost GPS Aided Inertial Navigation System for Vehicle Applications", 2005 13th European Signal Processing Conference, Sep. 4-8, 2005.

Sleewaegen, Jean-Marie , et al., "Galileo E5b Rover Receiving E5a Corrections? No Problem!", 32nd International Technical Meeting of the Satellite Division of the Institute of Navigation (ION GNSS+ 2019), Miami, Florida, Sep. 16-20, 2019.

Snelson, Edward , et al., "Sparse Gaussian Process using Pseudo-inputs", NIPS'05: Proceedings of the 18th International Conference on Neural Information Processing Systems, Dec. 2005, pp. 1257-1264.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji , et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

Takenaka , et al., "Geolocation Correction for Geostationary Satellite Observations by a Phase-Only Correlation Method Using a Visible Channe", MPDI, Aug. 1, 2020, retrieved on Oct. 3, 2023. Retrieved from the internet <URL: http://www.mdpi.com/2072-4292/12/15/2472>.

Tanedo, Flip , "Notes on non-holonomic constraints", For P3318, Spring 2013, https://www.physics.uci.edu/~tanedo/files/teaching/P3318S13/Sec_05_nonholonomic.pdf.

Teunissen, P.J.G. , "GNSS Integer Ambiguity Validation: Overview of Theory and Methods", Proceedings of the ION 2013 Pacific PNT

(56) References Cited

OTHER PUBLICATIONS

Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank, et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.

Verhagen, S., "The GNSS integer ambiguities: Estimation and validation", Aerospace Engineering, Jan. 31, 2005.

Waserman, Eyal, et al., "A Mixed Integer Least-Squares Formulation of the GNSS Snapshot Positioning Problem", https://github.com/eyalw711/snapshot-positioning, Jun. 2, 2021.

Won, Dachee, et al., "Performance Improvement of Inertial Navigation System by Using Magnetometer with Vehicle Dynamic Constraints", Hindawi, vol. 2015, published 2015, Article ID 435062, https://doi.org/10.1155/2015/435062, https://www.hindawi.com/journals/js/2015/435062/.

Wubbena, Gerhard, et al., "PPP-RTK: Precise Point Positioning Using State-Space Representation in RTK Networks", Presented at the 18th International Technical Meeting, ION GNSS-05, Sep. 13-16, 2005, Long Beach, California.

Wubbena, Gerhard, et al., "RTK Networks based on Geo++ GNSMART—Concepts, Implementation, Results", ION GPS 2001, Sep. 11-14, 2001, Salt Lake City, UT.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Yang, Y., et al., "L1 Backup Navigation for Dual Frequency GPS Receiver", Proceedings of the 16th International Technical Meeting of the Satellite Division of The Institute of Navigation (ION GPS/GNSS 2003), Portland, OR, Sep. 2003, pp. 1258-1263.

Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.

"An Introduction to GNSS, Chapter 4, GNSS Error Sources", https://novatel.com/an-introduction-to-gnss/chapter-4-gnsserror-sources, published 2015.

"Geo++ SSR For Network-RTK, PPP and PPP-RTK", https://geopp.de/wp-content/uploads/2020/09/SSR_Flyer_v3.pdf, Sep. 2015.

"IGS State Space Representation (SSR) Format Version 1.00", International GNSS Service (IGS), Oct. 5, 2020.

"Integrity-Navipedia", https://gssc.esa.int/navipedia/index.php/Integrity, published 2011.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

"RAIM", GMV, 2011, RAIM.

"Safe Position Augmentation for Real-Time Navigation (SPARTN) Interface Control Document Version 1.8.0", Jan. 2020, Sapcorda Services GmbH.

"Swift Navigation Binary Protocol", Version 3.4.5, Mar. 10, 2021, pp. 1-156.

Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.

Angelo, Joseph, et al., "System and Method for Detecting Outliers in GNSS Obervations", U.S. Appl. No. 18/116,117, filed Mar. 1, 2023.

Blanch, Juan, et al., "RAIM with Optimal Integrity and Continuity Allocations Under Multiple Failures", IEEE Transactions on Aerospace and Electronic Systems, vol. 46, No. 3, Jul. 2010.

Brack, A., "Optimal Estimation of a Subset of Integers With Application To GNSS", Artificial Satellites, vol. 51, No. 4—2016 DOI: 10.1515/arsa-2016-0011.

Brocard, Philippe, "Integrity monitoring for mobile users in urban environment", https://tel.archives-ouvertes.fr/tel-01379632/document, submitted Oct. 11, 2016.

Bruno, Jon, et al., "A realistic simulation framework to evaluate ionospheric tomography", Advances in Space Research 65 (2020) 891-901.

Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.

Chiu, David S., et al., "Bierman-Thornton UD Filtering for Double-Differenced Carrier Phase Estimation Accounting for Full Mathematical Correlation", Jan. 2008, ION NTM 2008, pp. 756-762., Jun. 23, 2017 00:00:00.0.

Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.

Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.

Favey, Etienne, et al., "Dead reckoning fills-in GPS navigation gap", EE Times, Automotive Designline, Aug. 18, 2011.

Feng, Shaun, et al., "Carrier phase-based integrity monitoring for high-accuracy positioning", GPS Solution, Apr. 2009.

Gratton, Livio, et al., "Carrier Phase Relative RAIM Algorithms and Protection Level Derivation", Journal of Navigation (2010), 63, 215-231, doi: 10.1017/S0373463309990403.

Gunning, Kazuma, et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.

Henkel, Patrick, et al., "Joint L-/C-Band Code and Carrier Phase Linear Combinations for Galileo", International Journal of Navigation and Observation, vol. 2008, Article ID 651437, 8 pages.

Hirokawa, Dr. Rui, "Recent Activity of International Standardization for High-Accuracy GNSS Correction Service", Mitsubishi Electric, Jun. 27, 2019.

Huang, Panpan, "Airborne GNSS PPP Based Pseudolite System", School of Civil and Environmental Engineering Faculty of Engineering UNSW. Jun. 2019.

Ibrahim, Hassan E., et al., "A Regional Stochastic Model for NOAA-Based Residual Tropospheric Delay", ION NTM 2008, Jan. 28-30, 2008, San Diego, CA.

Karaim, Malek, et al., "GNSS Error Sources", https://www.intechopen.com/books/multifunctional-operation-and-application-of-gps/gnss-error-sources, published Apr. 6, 2018.

(56) References Cited

OTHER PUBLICATIONS

Khanafseh, Samer, et al., "GNSS Multipath Error Modeling for Automotive Applications", Abstract only, Proceedings of the 31st International Technical Meeting of the Satellite Division of The Institute of Navigation (ION GNSS+ 2018), Miami, Florida, Sep. 2018, pp. 1573-1589, https://www.ion.org/publications/abstract.cfm?articleID=16107.

Kilic, Cagri, et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.

Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.

Ko, Jonathan, et al., "GP-UKF: Unscented kalman filters with Gaussian process prediction and observation models", Conference Paper, Dec. 2007, 10.1109/IROS.2007.4399284.

Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.

Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

Lei, Yu, et al., "Prediction of Navigation Satellite Clock Bias by Gaussian Process Regression", Lecture Notes in Electrical Engineering 342:411-423, Jan. 2015.

Li, T., et al., "Some remarks on GNSS integer ambiguity validation methods", Survey Review, Dec. 5, 2012, vol. 44, No. 326.

Lim, Cheol-Soon, et al., "Feasibility Study on Integration of SSR Correction into Network RTK to Provide More Robust Service", JPNT 7(4), 295-305 (2018).

Lin, Ming, et al., "Robust Gaussian Process Regression for Real-Time High Precision GPS Signal Enhancement", www.gps.gov/systems/gps/performance/accuracy, Jun. 5, 2019.

Liu, Haiying, et al., "A closed-loop EKF and multi-failure diagnosis approach for cooperative GNSS positioning", Engineering, GPS Solutions, Published 2015.

Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.

Meng, Xiaoli, et al., "A Robust Vehicle Localization Approach Based on GNSS/IMU/DMI/LiDAR Sensor Fusion for Autonomous Vehicles", Sensors, 2017, 17, 2140.

Odijk, Dennis, et al., "On the estimability of parameters in undifferenced, uncombined GNSS network and PPP-RTK user models by means of S-system theory", Journal of Geodesy, Nov. 2015.

Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.

Pervan, Boris, et al., "Shaping Aviation Integrity Two RAIMs for Safety", GPS World The Business and Technology of Global Navigation and Positioning, Apr. 1, 2008.

Phelts, R. Eric, et al., "Innovation: Improving ARAIM, An approach using precise point positioning", GPS World, Jun. 13, 2020, https://www.gpsworld.com/innovation-improving-araim/.

Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Rasmussen, C.E., et al., "Gaussian Processes for Machine Learning", MIT Press, 2006, ISBN 026218253X. c 2006 Massachusetts Institute of Technology, (Year: 2006).

Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.

Rothacher, M., et al., "ANTEX: The Antenna Exchange Format, Version 1.4", Sep. 15, 2010, IGC International GNSS Service, https://kb.igs.org/hc/en-us/articles/216104678-ANTEX-format-description.

Satirapod, Chalermchon, "Improving the GPS Data Processing Algorithm for Precise Static Relative Positioning", School of Surveying and Spatial Information Systems The University of New South Wales. Jan. 2002.

Schmid, R., et al., "Estimation of elevation-dependent satellite antenna phase center variations of GPS satellites", Journal of Geodesy (2003) 77: 440-446, May 19, 2003, DOI 10.1007/s00190-003-0339-0.

Brocard, Philippe, et al., "System and Method for Distributed Integrity Monitoring", U.S. Appl. No. 18/491,167, filed Oct. 20, 2023.

Smolyakov, Ivan, et al., "System and Method for Determining GNSS Corrections", U.S. Appl. No. 18/241,542, filed Sep. 1, 2023.

\* cited by examiner

SYSTEM AND METHOD FOR DETERMINING GNSS CORRECTIONS

CROSS-REFERENCE TO RELATED APPLICATIONS

This application claims the benefit of U.S. Provisional Application No. 63/404,301, filed 7 Sep. 2022 and U.S. Provisional Application No. 63/403,212, filed 1 Sep. 2022, each of which is incorporated in its entirety by this reference.

TECHNICAL FIELD

This invention relates generally to the satellite positioning field, and more specifically to a new and useful system and method in the satellite positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
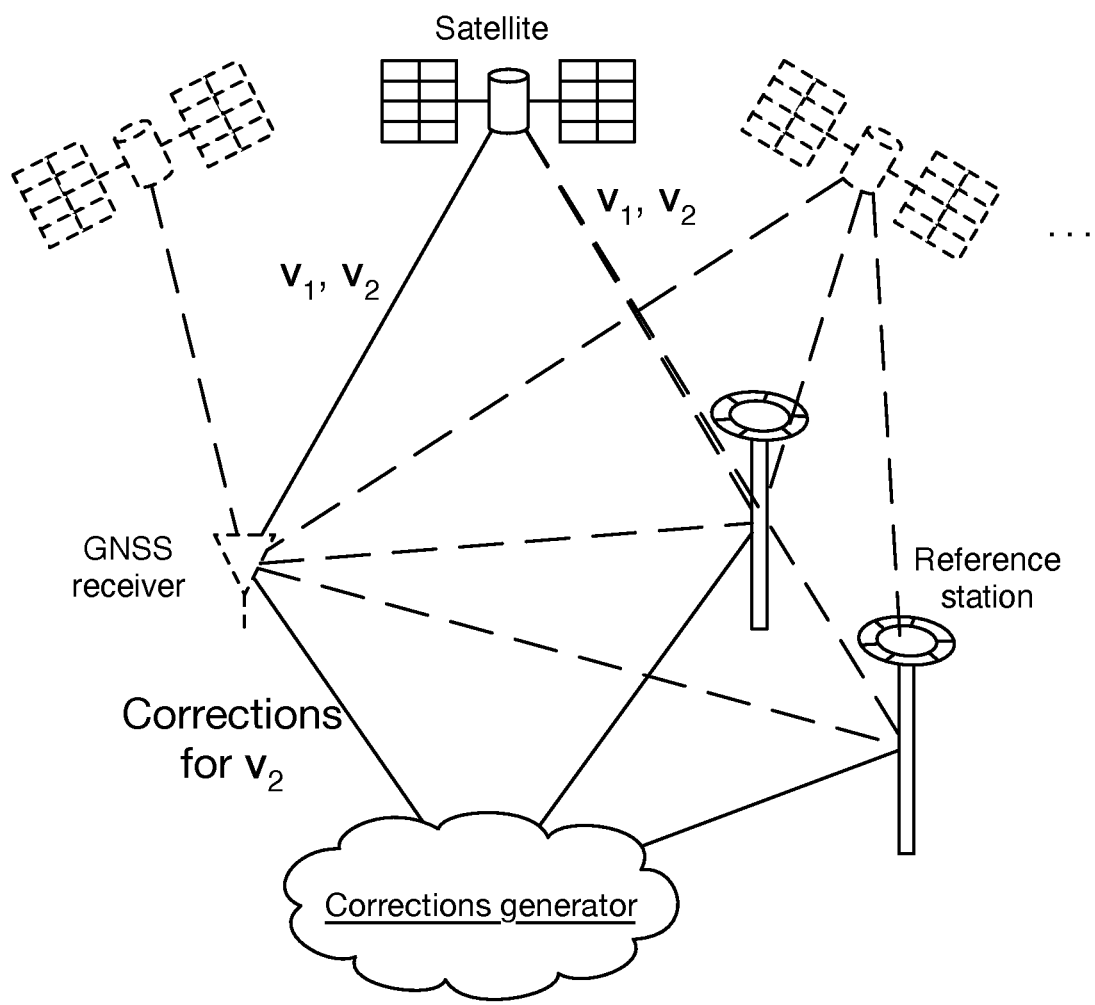
FIG. 1 is a schematic representation of the apparatus.

As shown for example in FIG. 1, the system can include (and/or receive data from) one or more data sources (e.g., satellites, reference stations, etc.), a computing system (e.g., a corrections generator thereof), optionally a GNSS receiver, and optionally one or more sensors.

Figure 2:
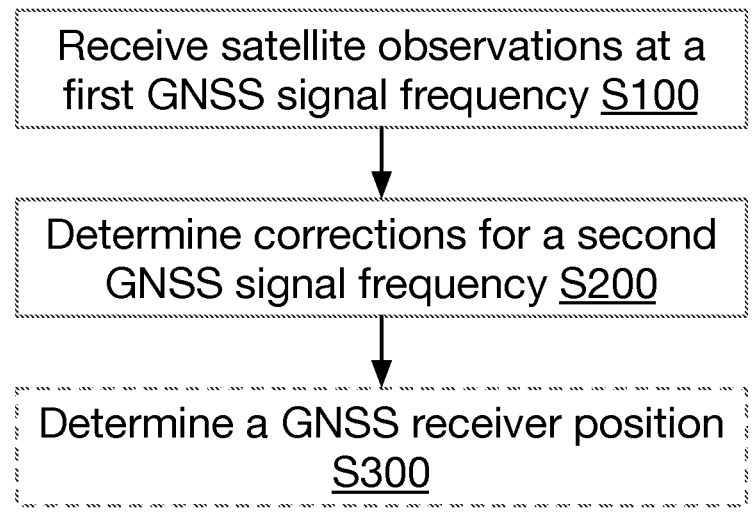
FIG. 2 is a schematic representation of the method.

As shown for example in FIG. 2, the method can include receiving satellite observations at a first signal frequency S100, determining GNSS corrections for a second signal frequency S200, and optionally determining a GNSS receiver position based on the GNSS corrections S300.

The system and method preferably function to determine (e.g., calculate, estimate, predict, etc.) GNSS corrections, which can enable determination of a receiver kinematic solution with a high accuracy (e.g., cm-level, dm-level, m-level, etc.), availability, integrity, and/or other property. However, the system and method can otherwise be used.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system, wherein the system can use the data for control and/or navigation.

2. Benefits

Variations of the technology can confer several benefits and/or advantages.

First, variants of the technology can facilitate interfacing different hardware generations and/or accommodate new technologies (e.g., the addition, approval, etc. of new carrier frequencies) in satellite positioning without requiring older hardware be replaced. For example, (legacy) hardware can be used to receive satellite observations at a first frequency and a corrections generator can be used to convert the satellite observations into GNSS corrections at a second frequency (e.g., rather than requiring the satellite observations be observed at the second frequency to generate the corrections, in addition to or alternative to using satellite observations at the second frequency, etc.).

Figure 4:
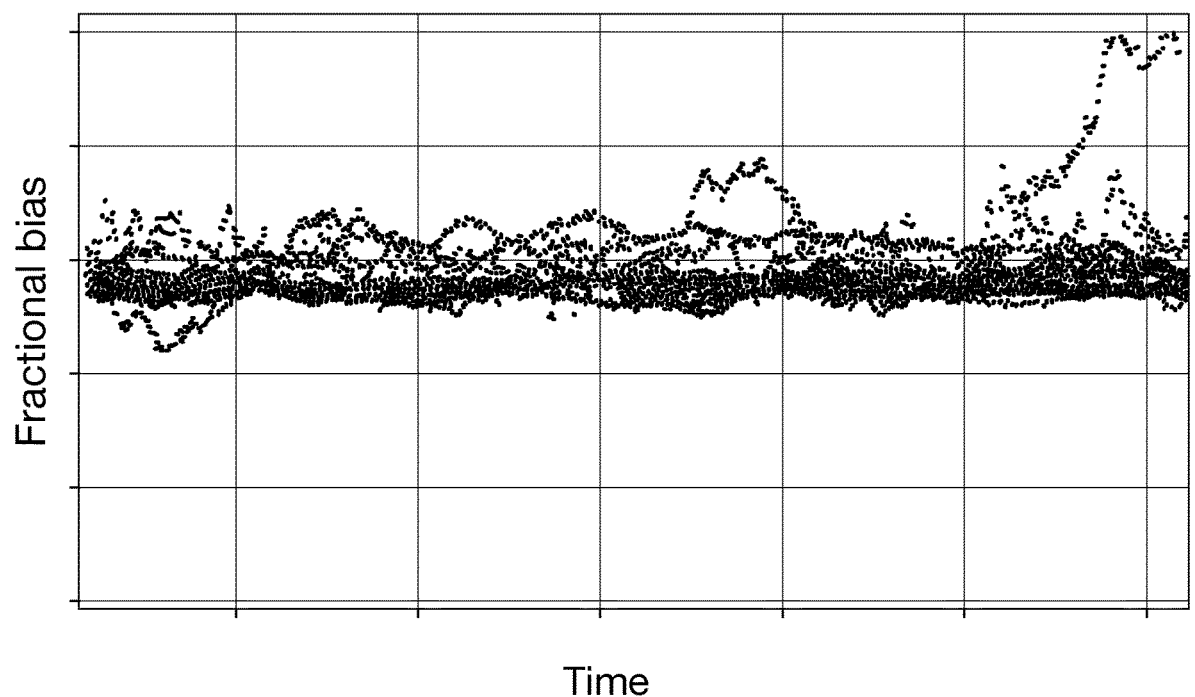
FIG. 4 is a scatter-plot representation of an example of a bias stability between an observed and a computed carrier-phase for satellites.
Figure 5:
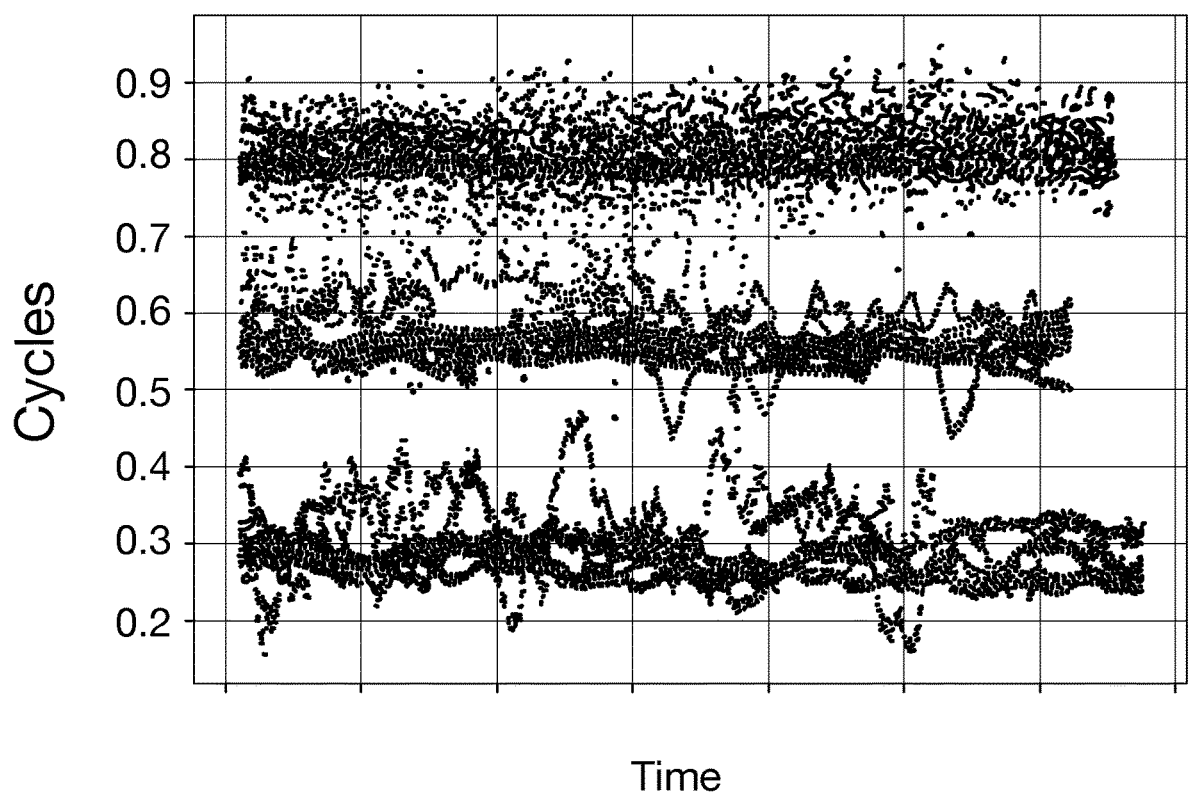
FIG. 5 is a scatter-plot representation of an example of a bias stability between an observed and a computed carrier-phase for a plurality of satellite-receiver pairs.

Second, the inventors have discovered that bias between a computed carrier phase and a measured carrier phase is stable in time (as shown for example in FIG. 4 where each line is associated with a different satellite; as shown for example in FIG. 5 where each color set corresponds to a plurality of satellites detected by a common receiver and each color represents a different receiver; varies by less than a threshold deviation such as standard deviation less than 0.01 cycles, 0.05 cycles, 0.1 cycles, 0.15 cycles, 0.2 cycles, etc.; has a maximum magnitude of deviation—absent faults, outliers, interference effects, etc.—less than 0.01 cycles, 0.05 cycles, 0.1 cycles, 0.15 cycles, 0.2 cycles, etc.; etc.). As a result, variants of the technology can use corrections for a frequency (e.g., carrier frequency) that are determined based on satellite observations at a different frequency to determine a position of a GNSS receiver with high accuracy and/or high integrity (e.g., without drifting over time). Relatedly, the inventors have found that, in some variants, such as when the inter-frequency code bias between the first and second frequency are substantially the same, then the inter-frequency code bias does not need to be determined or considered (e.g., because other corrections and/or states, such as the receiver clock, can absorb the code bias).

Third, variants of the technology can decrease a computational requirement for a corrections generator. In a specific example, by enabling corrections for a first frequency to be converted to corrections for a second frequency, only an estimator for a single frequency is necessary (e.g., reducing a number of states of an estimator by up to half, decreasing a processor requirement by up to about half, increasing a processing speed by up to approximately a factor of 2, using a single estimator rather than an estimator for a first frequency and an estimator for a second frequency, etc.). Relatedly, variants of the technology can improve a scalability of generating and/or disseminating (e.g., transmitting, providing, etc.) corrections. For instance, in specific variants, the corrections can be converted from a first to a second frequency once (e.g., at a corrections generator) rather than at each GNSS receiver (e.g., such as converting observations from a first frequency to a second frequency at each base station, rover, etc.).

However, variants of the technology can confer any other suitable benefits and/or advantages.

3. System

As shown for example in FIG. 1, the system can include (and/or receive data from) one or more data sources (e.g., satellites, reference stations, etc.), a computing system (e.g., a corrections generator thereof), optionally a GNSS receiver, and optionally one or more sensors. The system can function to determine corrections to satellite observations (e.g., detected by the GNSS receiver), determine the position of the GNSS receiver and/or external system, and/or can otherwise function.

The system preferably uses a set of data collected by one or more data sources. Data sources can include: GNSS receivers, sensors (e.g., located onboard the GNSS receiver, the external system, a reference station, etc.), databases, base stations (e.g., reference stations), satellites, and/or any other suitable data source. Examples of data that can be used include: satellite observations (e.g., satellite code, carrier phase, Doppler, etc.; derived information such as pseudorange; etc.), sensor data, and/or any other suitable data.

The GNSS receiver preferably functions to track satellite signals (e.g., to determine, generate, etc. a set of satellite observations) from one or more satellites. In variants, the GNSS receiver (e.g., a processor or measurement engine thereof) can determine the location (e.g., by using pseudorange, by using carrier phase) of the GNSS receiver (e.g., the receiver antenna, the external system, etc.) based on the satellite observations and/or sensor readings. The GNSS receiver can be in communication with a computing system, can include a computing system (e.g., a processor, a positioning engine, a fusion engine, etc.), can be integrated with the computing system, and/or the GNSS receiver and computing system can be arranged in any suitable manner. The GNSS receiver can be a stand-alone device (e.g., a stand-alone antenna or set of antennas), can be integrated into the rover (e.g., be a component of an automobile, aero vehicle, nautical vehicle, etc.), can be (e.g., be included in, be a component of, be a chip of, etc.) a user device (e.g., smart phone, laptop, cell phone, smart watch, etc.), and/or can be configured in any suitable manner.

The set of satellite observations can include orbital data, timestamp, range rate data, carrier phase data, code phase data, pseudorange data, doppler data, and/or any suitable data. The set of satellite observations can be associated with metadata (e.g., ephemeris), and/or any suitable data. The set of satellite observations can include satellite observations corresponding to satellites from one or more satellite constellation (e.g., Global Positioning System (GPS), GLObal Navigation Satellite System (GLONASS), BeiDou positioning System (BDS), Galileo, Navigation with Indian Constellation (NavIC), Quasi-Zenith Satellite System (QZSS), GPS Aided Geo Augmented Navigation (GAGAN), etc.). The set of satellite observations can additionally or alternatively include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data.

In variants of the system including more than one GNSS receiver (e.g., more than one antenna), each GNSS receiver can be the same or different, which can function to provide redundancy, provide information in the event of an outage to one of the antennas, provide validation and/or cross checks between data sources, and/or otherwise function. For example, different GNSS receivers can be configured to receive satellite observations associated one or more satellite constellations, one or more carrier frequencies (e.g., L1, L1C, L2, L3, L5, L6, E1, E5a, E5b, E5altboc, E5, E6, G1, G3, B1I, B1C, B2I, B2a, B3I, LEX, S band, C band, etc. frequencies), and/or corresponding to any suitable data.

The reference stations (e.g., base stations) preferably function to receive satellite observations which can be used to correct satellite observations made at the GNSS receiver (e.g., mobile receiver). The reference station satellite observations can be used to difference (e.g., form combinations with) the GNSS receiver observations, to model corrections (e.g., used by a corrections generator to generate a model of the GNSS corrections), and/or can otherwise be used. The reference stations are typically within a threshold distance of the GNSS receiver (e.g., within 10 km, 20 km, 50 km, 100 km, 150 km, 300 km, etc.), but can be further than the threshold distance from the GNSS receiver. The reference stations are preferably distributed such that for a given geographical region (e.g., city, county, province, state, country, continent, etc.) a GNSS receiver is within the threshold distance of at least one reference station. However, the reference stations can otherwise be distributed or arranged. The reference stations are preferably at substantially the same height relative to sea level (e.g., within about 100 m of the same height above sea level), but can have any suitable height(s) relative to each other and/or relative to the sea level.

Figure 3:
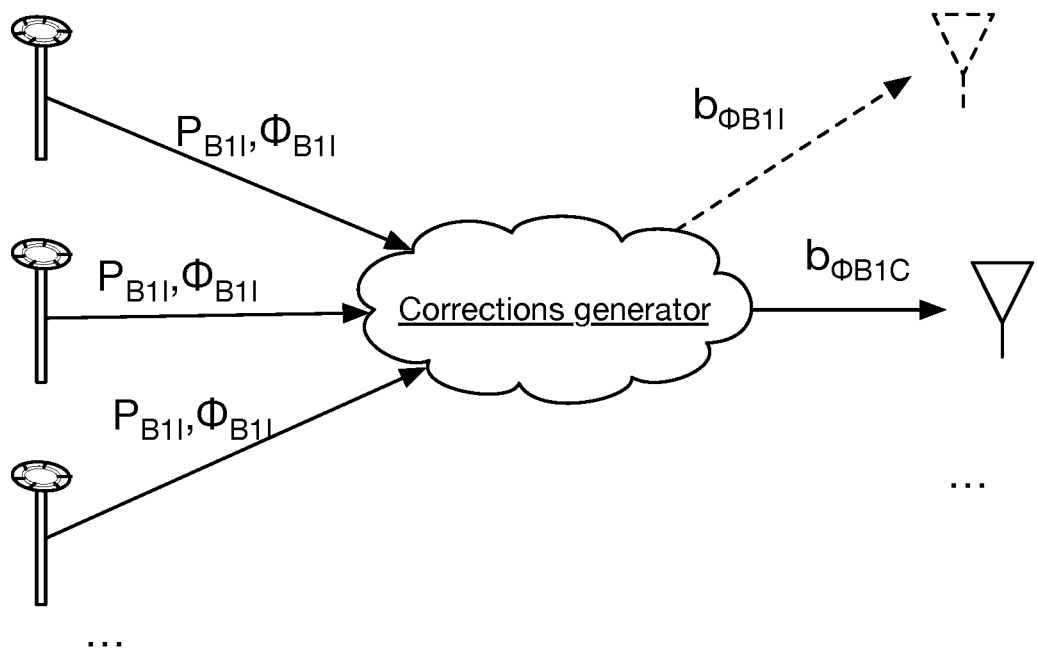
FIG. 3 is a schematic representation of an example of the method.

The reference station(s) can receive satellite observations at the same and/or at a different frequency from the GNSS receiver. As an illustrative example (as shown for instance in FIG. 3), the reference station(s) can receive satellite observations at a first satellite carrier frequency (e.g., L2 frequency, B1I frequency, E5a frequency, 1227.60 MHz, 1176.45 MHz, 1561.098 MHz, etc.) while the GNSS receiver can receive satellite observations at a second carrier frequency (e.g., L5 frequency, B1C frequency, E5b frequency, 1176.45 MHz, 1207.14 MHz, 1575.42 MHz, etc.). However, the reference station(s) and the GNSS receiver(s) can receive any suitable satellite observations.

The optional sensor(s) can function to measure sensor data (e.g., auxiliary data) associated with the external system (and/or the GNSS receiver). The sensor data can be used to determine (e.g., independent of the satellite observations) the external system location (e.g., fused with the GNSS positioning solution or satellite signals such as disclosed in U.S. patent application Ser. No. 17/860,779 titled 'SYSTEM AND METHOD FOR FUSING DEAD RECKONING AND GNSS DATA STREAMS' filed 8 Jul. 2022 which is incorporated in its entirety by this reference), but can additionally or alternatively be used to assist (e.g., speed-up, correct, refine, etc.) the calculation (e.g., calculating the state vector, estimating the phase ambiguity, converge or reconverge such as disclosed for example in U.S. patent application Ser. No. 17/686,588 titled 'SYSTEM AND METHOD FOR RECONVERGING GNSS POSITION ESTIMATES' filed 4 Mar. 2022 which is incorporated in its entirety by this reference, etc.) of position from the satellite observations and/or be otherwise used. The sensors are preferably in communication with the computing system.

The sensors can be: on-board the external system, on-board a separate external system, integrated into the GNSS receiver, separate from the GNSS receiver, and/or otherwise associated with the GNSS receiver.

The sensor data can include: inertial data (e.g., acceleration, angular velocity, angular acceleration, magnetic field, etc.), odometry, pose (e.g., position, orientation), mapping data (e.g., images, point clouds), temperature, pressure, ambient light, images (e.g., thermal images, optical images, etc.; landmarks, features, etc. associated with the images; etc.), video feeds, and/or any other suitable data. The sensors can include one or more of: inertial measurement unit (IMU), accelerometer, gyroscope, magnetometer, odometer (e.g., wheel speeds; wheel ticks; steering angles; visual odometers such as cameras; etc.), pressure sensors, distance measurement instrument, image sensor (e.g., camera, thermal camera, etc.), LIDAR, RADAR, SONAR, and/or any suitable sensor.

The system (e.g., an external system connected to the system, a base station, etc.) can include more than one GNSS receivers and/or sensors, which can function to provide redundancy, provide information in the event of an outage to one of the GNSS receivers or sensors, provide validation and/or cross checks between data sources (e.g., be used to monitor or detect the incoming data streams), and/or otherwise function. The relative pose between each GNSS receiver (e.g., between each GNSS receiver antenna), each sensor, and/or each GNSS receiver/sensor pair is preferably known, but can be unknown.

The computing system preferably functions to process the data (e.g., satellite observations, reference station observations, sensor data, etc.) received by the GNSS receiver(s), the reference station(s), and/or the sensor(s). The computing system can: determine GNSS corrections (e.g., based on the reference station satellite observations), convert (e.g., transform) between GNSS frequencies (e.g., switch a GNSS correction from a first frequency to a second frequency), filter the data (e.g., to calculate state vectors, ambiguities such as phase ambiguities, etc. associated with the data), calculate the GNSS receiver position (e.g., the GNSS phase center position), calculate an integrity of the solution (e.g., the protection level, the integrity risk, the total integrity risk, etc.), calculate the external system (e.g., vehicle, rover, etc.) positioning solution (e.g., kinematic solution, position, velocity, attitude, acceleration, etc.), correct the data (e.g., correct the satellite observations for clock errors, hardware bias, atmospheric effects, etc.), and/or can process the data in any suitable manner. The computing system can be local (e.g., to the external system, to the GNSS receiver, to a base station, etc.), remote (e.g., cloud computing, server, networked, etc.), and/or otherwise distributed (e.g., between a processor collocated with a GNSS receiver and a cloud computing system).

The computing system is preferably communicably coupled to the GNSS receiver and/or the base station(s), but can be communicably coupled to any suitable data sources. For example, the computing system can be distributed between a local computing system that is colocalized with (e.g., integrated into) the GNSS receiver (and/or external system) and a remote computing system (e.g., a cloud computing server, remote computer bank, etc.). However, the computing system can be a remote computing system, a local computing system (e.g., collocated with the GNSS receiver, integrated in the external system, etc.), and/or can otherwise be distributed (e.g., between two or more separate servers).

The computing system can include a corrections generator (e.g., configured to determine corrections, configured to convert corrections and/or satellite observations from a first frequency to a second frequency, corrections engine, etc.), a positioning engine (e.g., configured to determine a kinematic solution such as position, velocity, attitude, etc. for a GNSS receiver or associated external system), an integrity monitor (e.g., configured to monitor satellite observations for a potential feared event, configured to monitor corrections for a potential feared event such as a change in fractional phase bias, fractional phase bias stability, inter-frequency code bias stability, inter-frequency carrier phase stability, etc.), and/or any suitable component(s).

The corrections generator functions to determine (e.g., model, filter, calculate, compute, estimate, etc.) the GNSS corrections. The corrections generator can generate corrections from reference station data (e.g., pseudorange and/or carrier phase from reference stations), global corrections data (e.g., satellite clock, satellite orbit, bias, etc.), and/or metadata (e.g., reference station positions, ocean tide loading, antenna type, receiver type, almanac data, etc.), but may additionally or alternatively generate corrections using sensor data, satellite observations (e.g., as detected at a GNSS receiver), and/or any input data.

The GNSS corrections are preferably SSR (state space representation) corrections (e.g., error estimates separate error source(s)). However, the GNSS corrections can additionally or alternatively include be OSR (observation space representation) corrections (e.g., a lump sum of errors resulting from one or more error source such as satellite clock, satellite orbit, satellite signal bias, ionospheric delay, ionospheric advance, tropospheric delay, etc. such as provided as a range correction for a combination of satellites, frequencies, and/or signals), and/or can be any suitable correction representation.

For example, the corrections generator (and/or a corrections monitor) can operate in a manner similar to a corrections engine (and/or components thereof such as PPP filters, atmospheric modeler, correction generator, reference observation monitor, correction data monitor, metadata monitor, modeling engine, reliability engine, etc.) as disclosed in U.S. patent application Ser. No. 17/829,019 titled 'SYSTEMS AND METHODS FOR HIGH-INTEGRITY SATELLITE POSITIONING' filed 31 May 2022 or U.S. patent application Ser. No. 18/210,455 titled 'SYSTEMS AND METHOD FOR DISTRIBUTED DENSE NETWORK PROCESSING OF SATELLITE POSITIONING DATA' filed 15 Jun. 2023, each of which is incorporated in its entirety by this reference. In another (related and/or combinable with the preceding example) example, a corrections generator can generate corrections (e.g., SSR corrections) using a Gaussian model (for instance in a manner as disclosed in U.S. patent application Ser. No. 17/554,397 titled 'SYSTEM AND METHOD FOR GAUSSIAN PROCESS ENHANCED GNSS CORRECTIONS GENERATION' filed 17 Dec. 2021 which in incorporated in its entirety by this reference) to process reference station satellite observations to estimate the corrections. In a third (related and/or combinable with the preceding examples), the corrections generator can further include a VRS generator and/or can generate satellite observations associated with a virtual reference station (VRS) from the SSR corrections (for instance in a manner as disclosed in U.S. patent application Ser. No. 18/079,640 titled 'SYSTEM AND METHOD FOR CORRECTING SATELLITE OBSERVATIONS' filed 12 Dec. 2022 which in incorporated in its entirety by this reference).

4. Method

As shown for example in FIG. 2, the method can include receiving satellite observations at a first signal frequency S100, determining GNSS corrections for a second signal frequency S200, and optionally determining a GNSS receiver position based on the GNSS corrections S300.

The method preferably functions to determine GNSS corrections. The GNSS corrections are preferably used to determine high-accuracy (e.g., with an accuracy of 1 mm, 5 mm, 1 cm, 2 cm, 5 cm, 10 cm, 20 cm, 50 cm, 1 m, 2 m, values or ranges therebetween, etc.) and/or high-integrity (e.g., with a total integrity risk less than $10^{-4}$/hr, $10^{-5}$/hr, $10^{-6}$/hr, $10^{-7}$/hr, $10^{-8}$/hr, $10^{-9}$/hr, etc.) GNSS receiver positioning solutions (e.g., kinematic solutions; such as position, displacement, velocity, speed, attitude, acceleration, etc.). However, the GNSS corrections can otherwise be used (e.g., to determine a positioning solution for a GNSS receiver, rover, external system, etc.) and/or the method can otherwise function.

The method (and/or steps thereof) can be performed in real or near-real time (e.g., with satellite observation receipt, with external system and/or GNSS receiver operation, etc.), delayed (e.g., the corrections can be predetermined for future GNSS positioning solution determination), and/or can be performed with any suitable timing. The method (and/or steps thereof) can be performed once, repeatedly, iteratively, in response to a trigger (e.g., receipt of satellite observations, request from an operator, etc.), and/or with any suitable frequency and/or timing.

Receiving the satellite observations S100 functions to measure and/or detect a set of satellite signals, where each satellite signal is associated with a satellite. The satellite observations can be received at a reference station, a GNSS receiver, a computing system (e.g., where satellite observations can be stored and/or retrieved from a database), and/or at any suitable endpoint. In an illustrative example, satellite signals associated with (e.g., from) a first set of satellites are received by a GNSS receiver and satellite signals associated with (e.g., from) a second set of satellites are received by a set (of one or more) reference stations. The first and the second set of satellites can be the same, the first set of satellites can be a strict subset of the second set of satellites, the second set of satellites can be a strict subset of the first set of satellites, the first set of satellites can include one or more satellites that are in second set of satellites and one or more satellites that are not in the second set of satellites, and/or the first and second set of satellites can include any suitable satellites and/or relationships between satellites. In variations of this example, the GNSS receiver can receive satellite observations associated with (e.g., derived from, by tracking satellite signals at, etc.) a first satellite frequency (e.g., first carrier frequency) and the reference station(s) can receive satellite observations associated with (e.g., derived from, by tracking satellite signals at, etc.) a second satellite frequency (e.g., second carrier frequency). However, the reference station(s) and the GNSS receiver(s) can receive any suitable satellite observations. Satellite signals are preferably received for a common epoch, but can be received for any suitable epoch or relative time.

Determining GNSS corrections S200 functions to determine (e.g., calculate, estimate, generate, etc.) GNSS corrections that can be used by a GNSS receiver in determining a GNSS receiver positioning solution. The GNSS corrections are preferably determined by a corrections generator (e.g., operating on a cloud computing server, operating on a processor collocated with a GNSS receiver, operating on an external system processor, operating on a client server, etc.). However, the GNSS corrections can be determined using any suitable component. The GNSS corrections are preferably determined using a set of reference station observations (e.g., a set of one or more satellite observations received by one or more reference stations). However, the GNSS corrections can additionally or alternatively be determined using prior GNSS corrections, rover observations, sensor data, and/or any suitable data or information.

The GNSS corrections preferably include phase bias corrections (e.g., carrier phase bias corrections) and/or code bias corrections (code phase bias corrections). The GNSS corrections can additionally or alternatively include true bias corrections (e.g., carrier phase bias corrections and/or code bias corrections including common offset values, integer ambiguities), clock corrections, orbit corrections, atmospheric delay (e.g., ionosphere delay such as slant total electron count, vertical total electron count, horizontal electron count, ionospheric refraction, etc.; tropospheric delay such as hydrostatic delay, wet delay, etc.; etc.), and/or any suitable corrections.

The GNSS corrections are preferably state space representation (SSR) corrections (e.g., where different error terms are modeled and distributed separately, decomposed corrections, etc.). However, the GNSS corrections can additionally or alternatively be observation state representation (OSR) corrections (e.g., where error terms can be lumped together as an observation such as for a virtual reference station) and/or any suitable corrections.

Figure 6:
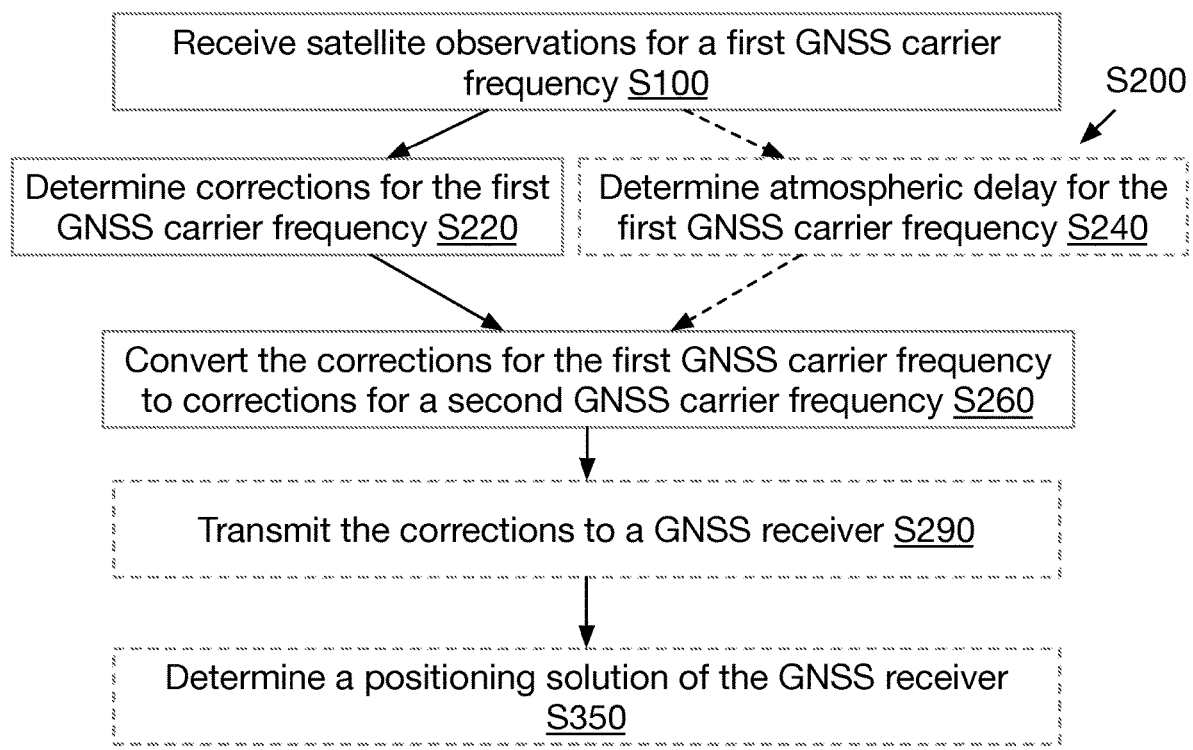
FIG. 6 is a schematic representation of an example of the method.

As shown for example in FIG. 6, determining the GNSS corrections S200 can include determining the GNSS corrections for a first frequency S220 (e.g., using a set of reference station observations associated with the first frequency), optionally determining an atmospheric delay for the first frequency S240, converting the GNSS corrections associated with the first frequency to GNSS corrections associated with a second frequency S260, and transmitting the GNSS corrections (e.g., associated with the first frequency, associated with the second frequency, etc.) to a GNSS receiver S290 (e.g., external system, mobile rover, etc.). Additionally or alternatively, determining the GNSS corrections can include determining the GNSS corrections for the second frequency (e.g., using the set of reference station observations associated with the first frequency, converting the set of reference station observations associated with the first frequency to reference station observations associated with the second frequency, etc.) and/or any suitable steps.

The GNSS corrections can be determined (e.g., in S220, S240, etc.) using a Kalman filter (e.g., extended Kalman filter, unscented Kalman filter, discriminative Kalman filter, adaptive Kalman filter, Kalman-Bucy filter, hybrid Kalman filter, etc.), a Gaussian process, a particle filter, and/or using any suitable estimator. The GNSS corrections can be determined using undifferenced and/or uncombined satellite observations (e.g., where an estimator for the corrections does not difference or combine the satellite observations, where the observations provided to the estimator are not differenced or combined, etc.) and/or using differenced and/or combined satellite observations (e.g., single differenced satellite observations between receivers, single differenced satellite observations between frequencies, single differenced satellite observations between epochs, single differenced satellite observations between satellites. double-differenced satellite observations between receivers and frequencies, double-difference satellite observations between receivers and epochs, double-differenced satellite observations between frequencies and epochs, double differenced satellite observations between receivers and satellites, double differenced satellite observations between frequencies and satellites, triple differenced satellite observations between receivers frequencies and epochs, etc.; combined satellite observations such as to form ionosphere-free combinations, geometry-free combination, wide-lane combination, narrow-lane combination, ultra-wide lane combination, Melbourne-Wübbena combination, group and phase ionospheric calibration combination, etc.; etc.).

In variants where a Gaussian process is used to determine the GNSS corrections (e.g., one or more component of the GNSS corrections), a covariance function (e.g., defining a relationship between two or more inputs to the Gaussian process) can include constant functions, polynomial (e.g., linear, quadratic, piecewise smooth polynomials, etc.) functions, white noise functions, Kronecker delta (or Dirac delta function) functions, squared exponential functions, Ornstein-Uhlenbeck (e.g., Brownian) functions, (e.g., with variable drift terms that are dependent on the current value of the process), Weiner functions, Matérn functions, Bessel functions, periodic functions, rational (e.g., rational quadratic) functions, γ-exponential functions, neural network covariance functions, and/or any suitable covariance function. In a first specific example, a covariance function for a satellite and/or receiver (e.g., reference stations, mobile receiver, etc.) error (such as a code phase bias, carrier phase bias, clock error, orbit error) can be an Ornstein-Uhlenbeck function such as: $c_{error}(z_i, z_j) = \sigma_{error}^2 e^{-\alpha_{error}|t_i - t_j|}$ where $z_i$ and $z_j$ are two observations corresponding to times $t_i$ and $t_j$ respectively, and $\sigma_{error}^2$ and $\alpha_{error}$ are hyperparameters which represent the total variance explained by the station clock and the time scale which indicates how much "memory" the station clock has or how quickly it decorrelates respectively. In a second specific example, a covariance function for a satellite and/or receiver (e.g., reference stations, mobile receiver, etc.) error (such as a code phase bias, carrier phase bias, clock error, orbit error) can be a squared exponential function such as $$c_{error}(z_i, z_j) = \sigma_{error}^2 e^{-\alpha_{error}(t_i - t_j)^2}.$$

However, any suitable covariance function can be used to determine each correction.

In related variants, determining atmospheric corrections (e.g., in S240) can include determining atmospheric corrections using a Gaussian model. In a first specific example, an atmospheric covariance function (e.g., an ionosphere or troposphere covariance function) can be a squared gaussian function such as:

$$c_{atm}(p_i, p_j) = \sigma_{atm}^2 e^{-\alpha_{atm}d(p_i,p_j)^2} \text{ or } c_{vert}(p_i, p_j) = \sigma_{vert}^2 e^{-\alpha_{vert}h(p_i,p_j)^2},$$

where $p_i$ and $p_j$ correspond to two pierce points (for example as shown in FIGS. 3A, 3B, and 3C), $d(p_i,p_j)$ corresponds to a distance function between the two pierce points, and h(pi,pj) corresponds to a height difference between the two pierce points. In a second specific example, an atmospheric covariance function (e.g., an ionosphere or troposphere covariance function) can be an Ornstein-Uhlenbeck function such as:

$$c_{atm}(p_k^s, p_{k'}^{s'}) = \sigma_{atm}^2 e^{-\alpha_{atm}|p_k^s - p_{k'}^{s'}|}.$$

In a third specific example, an atmospheric covariance function (e.g., an ionosphere or troposphere covariance function) can be a product of a mapping function (e.g., m(x)) and a covariance function such as: $c_{shell}(p_k^s p_{k'}^{s'}) = m(p_k^s) * c_{atm}(p_k^s p_{k'}^{s'}) * m(p_{k'}^{s'})$, where $c_{atm}(p_k^s p_{k'}^{s'})$ can represent the correlation between the electron content at two different points in space. $m(p_k^s)$ can represent the obliquity ($m(p_i^s) = 1/\cos(\theta_i)$, where $\theta_i$ is the angle at which a signal intersects the shell (e.g., relative to vertical), and/or be any other suitable mapping function. In a fourth specific example, an atmospheric covariance function can be a convolution of covariance functions such as: $c_{atm\_multiple}(I_{1,k}^s, I_{1,k}^{s'}) = \Sigma_i^m \Sigma_j^m c_{vert}(p_{k,i}^s, p_{k,j}^s) * c_{shell}(p_{k,i}^s, p_{k,j}^s)$, where $I_{1,k}^s$ corresponds to the ionosphere delay. In a fifth specific example, an atmospheric covariance functions can be an Ornstein-Uhlenbeck function such as:

$$c_{atm}(p_k^s, p_{k'}^{s'}) = \sigma_{atm}^2 e^{-\frac{|p_k^s - p_{k'}^{s'}|}{l_{atm}}},$$

where $l_{atm}$ is a hyperparameter corresponding to a length scale for the decorrelation of the pierce points. In the fifth specific example, a mean of the covariance function can be given by: $\mu(p_k^s) = a_{atm} + I_{k,model}^s$, where µ corresponds to the mean, $a_{atm}$ corresponds to an inferred atmospheric offset, and $I_{k,model}^s$ corresponds to the value that a model (e.g., the klobuchar model of the ionosphere, klobuchar model, NeQuick model, BeiDou global broadcast ionospheric delay correction model (BDGIM), etc.) would give for the zenith ionosphere delay at location $p_k^s$. In a sixth specific example, the atmospheric model includes a Gaussian process that uses covariances that model: a per-satellite bias (e.g., even with high-precision clock/orbit products), a multi-shell model (e.g., multiple shells for all satellites, one shell per satellite, etc.), and the great circle distance. However, the atmospheric delay can be otherwise modelled (e.g., using a Kalman filter or other estimator, according to $$I_{v2} = \frac{f_{v1}^2}{f_{v2}^2 - f_{v1}^2}(P_{v2} - P_{v1}) - BGD(f_{v2}, f_{v1})$$

where BGD is a broadcast group delay correction term provided by the satellite that may be neglected in some variations, etc.).

For example, the GNSS corrections (and/or components thereof) can be determined in a manner as disclosed in Ser. No. 17/554,397 titled 'SYSTEM AND METHOD FOR GAUSSIAN PROCESS ENHANCED GNSS CORRECTIONS GENERATION' filed 17 Dec. 2021, U.S. patent application Ser. No. 17/347,874 titled 'SYSTEMS AND METHODS FOR DISTRIBUTED DENSE NETWORK PROCESSING OF SATELLITE POSITIONING DATA' filed 15 Jun. 2021, and/or U.S. patent application Ser. No. 18/079,640 titled 'SYSTEM AND METHOD FOR CORRECTING SATELLITE OBSERVATIONS' filed 12 Dec.

2022, each of which is incorporated in its entirety by this reference. However, the GNSS corrections can be determined in any manner.

Converting (e.g., transforming) the GNSS corrections associated with the first frequency to GNSS corrections associated with a second frequency functions to generate corrections for a second frequency (e.g., without operating a model to process satellite observations associated with the second frequency, without using satellite observations associated with the second frequency, etc.). The GNSS corrections are preferably converted between frequencies according to an equation (e.g., depending on a ratio between the frequencies, depending on a difference between the frequencies, independently depending on the frequencies, etc.). However, the GNSS corrections can be converted between frequencies using machine learning, using an estimator (e.g., Gaussian process, Kalman filter, etc.), using a look-up table, and/or in any manner.

Typically, only frequency dependent corrections (e.g., terms that depend linearly or inverse linearly with frequency such as code bias, phase bias, ionospheric refraction, etc.) will be converted. However, frequency independent terms (e.g., terms that do not depend on frequency and/or depend on frequency with a nonlinear frequency dependence such as squared or higher for instance orbit, dock, tropospheric delay, relativistic effects, etc.) can be converted. For example, a calculated code bias and/or phase bias can be converted from a first frequency (e.g., that the bias was generated using data from) to a second frequency.

Converting the GNSS corrections can include converting the GNSS corrections from the first frequency to the second frequency while neglecting atmospheric delay effects. Terms that depend on the atmospheric delay (e.g., as shown below) typically include coefficients that depend on a frequency squared and (when combined with the typically small atmospheric delay term) are often negligible (e.g., would impact a positioning solution by less than a threshold distance such as <1 mm, <5 mm, <1 cm, <5 cm, etc.) and therefore can be neglected. However, additionally or alternatively, the conversion of the GNSS corrections can account for atmospheric delay effects (e.g., during periods of high ionospheric activity, when the difference between the first and the second frequency exceeds a threshold difference, etc.). For instance, a system performing the method could operate in two (or more modes) such as a mode that accounts for atmospheric effects (e.g., when the atmospheric delay terms will impact a positioning distance by more than the threshold distance, when the ionosphere activity is greater than a threshold activity, etc.) and a mode that neglects the atmospheric effects (e.g., when the atmospheric delay terms will impact a positioning distance by less than the threshold distance, when the ionosphere activity is less than a threshold activity, etc.). However, the system performing the method can operate in any suitable mode (e.g., a mode that converts satellite observations between frequencies, a mode that converts GNSS corrections between frequencies, a mode that computes the GNSS corrections at the second frequency by combining satellite observations at the second frequency with GNSS corrections determined at the first frequency and subsequently converted to the second frequency, etc.).

The first and second frequency are typically different frequencies. The first and second frequencies are preferably within a threshold frequency difference (e.g., differ by at most about 100, 50, 30, 25, 15, 10, 5, 1, etc. MHz). However, the first and second frequencies can differ by more than the threshold frequency difference (e.g., when the bias between the frequencies have a stability greater than a threshold stability such as differing by less than 0.2, 0.1, 0.05, 0.01, etc. cycles over a time scale of seconds, minutes, hours, days, etc.) and/or can have any suitable relationship. Relatedly, the first and second frequencies are preferably within the same frequency band (e.g., both within the L band, both within the lower L band, both within the upper L band, both within the C band, frequency bands allocated to Aeronautical Radio Navigation Services (ARNS), frequency bands allocated to Radio Navigation Satellite Systems (RNSS), etc.). However, the first and second frequencies can be within different frequency bands (e.g., when the bias between the frequencies have a stability greater than a threshold stability such as differing by less than 0.2, 0.1, 0.05, 0.01, etc. cycles over a time scale of seconds, minutes, hours, days, etc.).

As a first illustrative example (e.g., for satellite observations associated with Galileo satellites), a first frequency can be in the E5a or E5b frequency bands and the second frequency can be the other frequency band. In variations of the first illustrative example, the first or second frequency can be in the E5altboc and/or E6 frequency band. In a second illustrative example (e.g., for satellite observations associated with BeiDou satellites), the first frequency can be in the B1C frequency band and the second frequency can be in the B1I frequency band (or vice versa). However, any suitable first and second frequencies can be used. Additionally, or alternatively, corrections associated with two (or more frequencies) can be converted (e.g., combined) to determine GNSS corrections associated with a third frequency, GNSS corrections associated with a first frequency can be converted to GNSS corrections associated with 2 or more frequencies, and/or GNSS corrections associated with any number of frequencies can be converted to GNSS corrections associated with any number of frequencies.

In a first illustrative example, a satellite pseudorange signal (e.g., in units of distance such as cm, dm, m, etc.) for frequency band $v_2$ (with frequency $f_{v2}$) can be related to a satellite pseudorange signal for frequency band $v_1$ (with frequency $f_{v1}$) according to:

$$P_{v_2} = P_{v_1} + \left(\frac{f_{v1}^2}{f_{v2}^2} - 1\right) I_{v1} + \left(b_{P_{v2}} - b_{P_{v1}}\right)$$

where $P_{v_2}$ is the pseudorange signal (e.g., in units of distance such as cm, dm, m, etc.) for frequency $v_2$, where $P_{v_1}$ is the pseudorange signal (e.g., in units of distance such as cm, dm, m, etc.) for frequency $v_1$, $I_{v1}$ is the ionospheric delay for $v_1$ (e.g., in units of distance such as cm, dm, m, etc.), $b_{P_{v2}}$ is the pseudorange bias associated with $v_2$, and $b_{P_{v1}}$ is the pseudorange bias associated with $v_1$. However, in some variations, tropospheric effects (e.g., terms associated with tropospheric delays), and/or other effects can additionally or alternatively be considered.

In a second illustrative example, a satellite carrier phase signal ($\Phi$ e.g., in units of number of cycles or fractional cycles) for frequency $v_2$ (with frequency $f_{v2}$) can be related to a satellite carrier phase signal for frequency $v_1$ (with frequency $f_{v1}$) according to $$\Phi_{v_2} = \Phi_{v_1} + \frac{f_{v2} - f_{v1}}{c} P_{v1} - \frac{(f_{v2} - f_{v1})^2}{c f_{v2}} I_{v1} +$$

-continued $$N + (b_{\Phi_{v2}} - b_{\Phi_{v1}}) - \frac{f_{v2} - f_{v1}}{c} b_{P_{v1}}$$

where $P_{v_1}$ is the pseudorange signal (e.g., in units of distance such as cm, dm, m, etc.) for frequency $v_1$, $I_{v1}$ is the ionospheric delay for $v_1$ (e.g., in units of distance such as cm, dm, m, etc.), $b_{P_{v1}}$ is the pseudorange bias (e.g., code bias, code phase bias, etc.) associated with $v_1$, $b_{\Phi_{v2}}$ is the carrier phase bias associated with $v_2$, $b_{\Phi_{v1}}$ is the carrier phase bias associated with $v_1$, and c is the speed of light (e.g., in units of m/s such as in a vacuum, in atmosphere, etc.). In variants of this illustrative example, a carrier phase signal for $v_2$ can be computed according to $$\hat{\Phi}_{v2} = \Phi_{v1} + \frac{f_{v2} - f_{v1}}{c} P_{v1} - \frac{(f_{v2} - f_{v1})^2}{c f_{v2}} I_{v1}.$$

In some variations, the ionospheric delay term can be neglected (e.g., because it is assumed to be small such as less than about 0.05 cycles) such that the carrier phase signal can be computed according to $$\hat{\Phi}_{v2} = \Phi_{v1} + \frac{f_{v2} - f_{v1}}{c} P_{v1}.$$

However, in some variations, tropospheric effects (e.g., terms associated with tropospheric delays), and/or other effects can additionally or alternatively be considered.

A true bias ($B_\Phi$, such as a true carrier phase bias) between the observed and computed carrier phase can be determined as (e.g., defined as)

$$B_\Phi = \hat{\Phi}_{v2} - \Phi_{v2} = \hat{\Phi}_{v2} - \Phi_{v1} - \frac{f_{v2} - f_{v1}}{c} P_{v1}$$

(where the term associated with the ionospheric delay has been neglected). The true bias term can be represented as (e.g., defined as)

$$B_\Phi = N + (b_{\Phi_{v2}} - b_{\Phi_{v1}}) - \frac{f_{v2} - f_{v1}}{c} b_{P_{v1}}.$$

However, in some variations the ionospheric term will be present such as $$B_\Phi = \hat{\Phi}_{v2} - \Phi_{v1} - \frac{f_{v2} - f_{v1}}{c} P_{v1} - \frac{(f_{v2} - f_{v1})^2}{c f_{v2}} I_{v1} \text{ or } B_\Phi =$$

$$N + (b_{\Phi_{v2}} - b_{\Phi_{v1}}) - \frac{f_{v2} - f_{v1}}{c} b_{P_{v1}} - \frac{(f_{v2} - f_{v1})^2}{c f_{v2}} I_{v1}.$$

However, the true bias can be defined in any manner.

By considering the true bias to be 0 (e.g., in variants where the true bias will cancel with between satellite differencing such as single frequency differencing, double frequency differencing, triple frequency differencing, etc.; in variants where the true bias can be considered approximately constant and independently estimated or assumed in other errors, as shown for example in FIG. 4; etc.), a carrier phase bias correction associated with a first frequency band can be converted to a GNSS corrections associated with a second frequency band according to:

$$b_{\Phi_{v2}} = b_{\Phi_{v1}} + \frac{f_{v2} - f_{v1}}{c} b_{P_{v1}}$$

where $b_{\Phi_{v1}}$ is the phase bias correction (e.g., as determined in S220) associated with frequency band $v_1$ (e.g., in units of length such as cm, dm, m, etc.), $b_{\Phi_{v2}}$ is the phase bias correction associated with frequency band $v_2$ (e.g., in units of length such as cm, dm, m, etc.), $f_{v1}$ is the carrier frequency associated with $v_1$ (e.g., in units of Hz), $f_{v2}$ is the carrier frequency associated with $v_2$ (e.g., in units of Hz), $b_{P_{v1}}$ is the pseudorange bias correction (e.g., code bias correction) associated with frequency band $v_1$, and c is the speed of light (e.g., in units of m/s). Variations of this illustrative example can include an integer ambiguity term (e.g., N). However, the integer ambiguity term can be determined (e.g., allocated as) part of the carrier phase integer ambiguity and/or can otherwise be allocated or determined (e.g., within a common error state such as a clock error state). Additional and/or alternative variations can include an atmospheric delay term such as $$b_{\Phi_{v2}} = b_{\Phi_{v1}} + \frac{f_{v2} - f_{v1}}{c} b_{P_{v1}} + \frac{(f_{v2} - f_{v1})^2}{c f_{v2}} I_{v1},$$

where $I_{v1}$ is an ionospheric delay term (e.g., as calculated in S240) associated with frequency $v_1$ (e.g., in units of distance such as m). However, the carrier phase bias can be determined in any manner.

In a third illustrative example, a code bias correction for a single frequency (e.g., the first frequency code bias) can be used for both a first and second frequency satellite signal (e.g., $b_{P_{v2}} = b_{P_{v1}}$, where $b_{P_{v1}}$ is the pseudorange bias correction (e.g., code bias correction) associated with frequency band $v_1$ and $b_{P_{v2}}$ is the pseudorange bias correction associated with frequency band $v_2$). This illustrative example can leverage and/or benefit from the fact that the inter-frequency code biases between the first and second frequencies are substantially the same so the offset can be absorbed by other correction states (e.g., receiver clock state). In other variations, an equation similar to the above equation used for phase bias correction can be used to convert a code bias correction from a first frequency to a second frequency. In another variation, the code bias correction conversion can depend on and/or include terms that depend on an ionospheric delay such as:

$$b_{P_{v2}} = b_{P_{v1}} - \left(\frac{f_{v1}^2}{f_{v2}^2} - 1\right) I_{v1},$$

where $I_{v1}$ is an ionospheric delay term (e.g., as calculated in S240) associated with frequency $v_1$ (e.g., in units of distance such as m). However, the code bias correction be determined in any manner.

The above illustrative examples can be combined (e.g., to convert each of code phase bias and carrier phase bias from one frequency to another frequency) and/or used in isolation (e.g., only convert one of code bias correction or carrier phase bias correction to a different frequency). However, the bias correction (e.g., phase bias correction, code bias correction) can otherwise be determined (e.g., the satellite observations such as pseudorange, carrier phase, doppler, etc. can be converted to a different frequency such as according to $$P_{v2} = P_{v1} - \left(\frac{f_{v1}^2}{f_{v2}^2} - 1\right) I_{v1}, \Phi_{v2} = \Phi_{v1} + \frac{f_{v2} - f_{v1}}{c} P_{v1} + \frac{(f_{v2} - f_{v1})^2}{cf_{v2}} I_{v1}, D_{v2} = \frac{f_{v2}}{f_{v1}} D_{v1},$$

etc.; where the pseudorange, carrier phase, doppler, etc. at the different frequency can be used in the models to generate the corrections for the different frequency).

In some variants, determining the GNSS corrections can include monitoring the GNSS corrections which can function to detect (e.g., detect with a threshold probability of occurrence) a potential fault in the data (e.g., which can impact an accuracy, integrity, availability, etc. of the GNSS corrections at one or more frequency). The GNSS corrections are preferably monitored by the correction generator (e.g., an integrity monitor of the correction generator), but can be monitored by any suitable component. For example, a true bias can be monitored for satellite observations (e.g., associated with a subset of reference stations, associated with one or more mobile GNSS receivers, etc.) to determine whether the true bias is substantially stable (e.g., varies by less than about 0.1 cycles/hr, 0.1 cycles/min, 0.1 cycles/s, etc.). In related variants, a difference between satellite observations (e.g., satellite single differencing) can be monitored to determine how far the difference strays from 0. However, the GNSS corrections can be monitored in any manner (e.g., in a manner as disclosed in U.S. patent application Ser. No. 17/829,019 titled 'SYSTEMS AND METHODS FOR HIGH-INTEGRITY SATELLITE POSITIONING' filed 31 May 2022 which is incorporated in its entirety by this reference).

Figure 7:
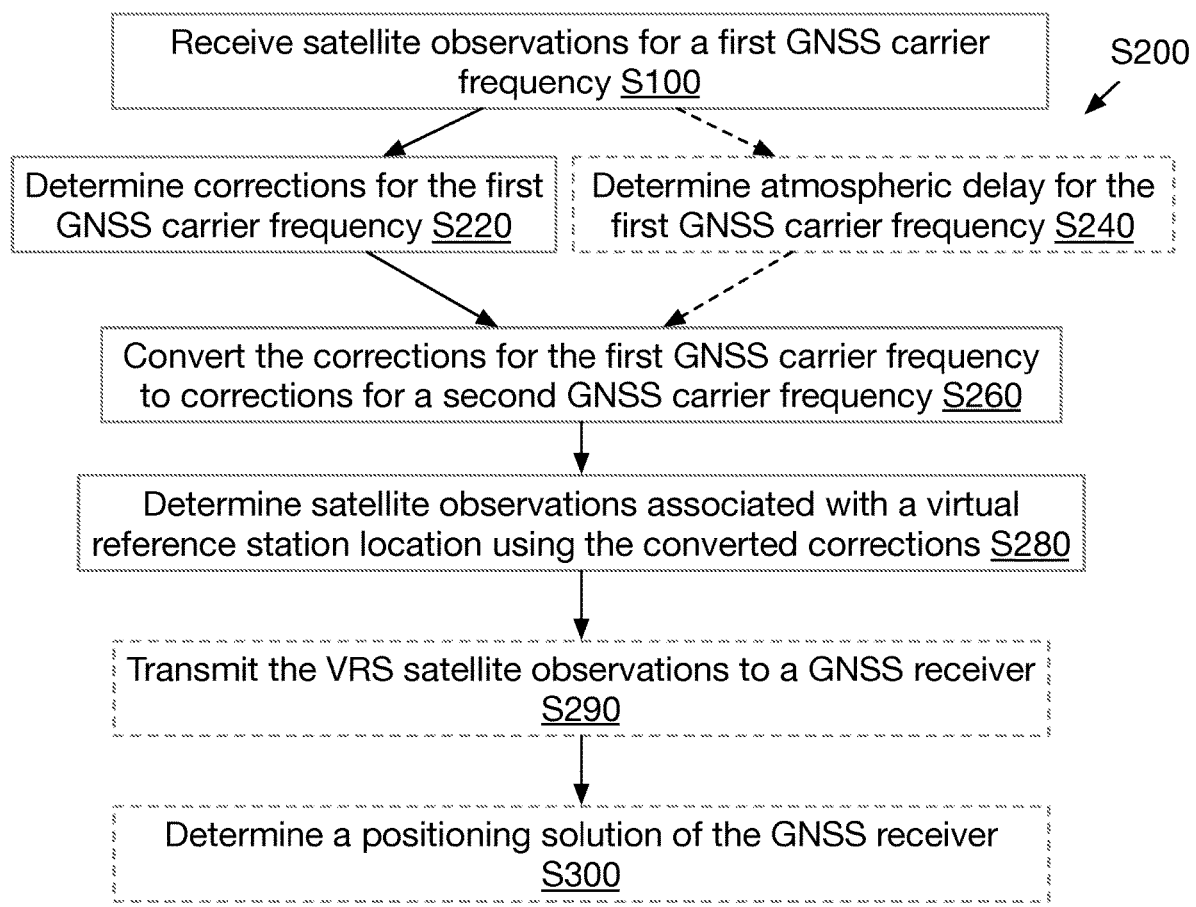
FIG. 7 is a schematic representation of an example of the method.

In some variants (as shown for example in FIG. 7), the determined corrections can be used to generate OSR corrections (e.g., decomposed corrections, SSR corrections, etc. can be used to generate synthetic satellite observations, VRS observations, etc. such as pseudorange, carrier phase, doppler, etc. for an arbitrary location, typically one that is not collocated with a base station, such as for a virtual reference station; for instance as disclosed in U.S. patent application Ser. No. 18/079,640 titled 'SYSTEM AND METHOD FOR CORRECTING SATELLITE OBSERVATIONS' filed 12 Dec. 2022 which is incorporated in its entirety by this reference). For example, the corrections determined at the second frequency (e.g., in S260) can be combined (e.g., with frequency independent corrections, with satellite observations from base stations, etc.) to generate VRS corrections (e.g., satellite observations for with a VRS location). In this example, the base station satellite observations may be at the first frequency and can be converted to the second frequency (e.g., in a manner analogous to that described above). In other examples, the VRS corrections can be generated for the first frequency (e.g., by combining the determined corrections with the base station observations) and then converted to the second frequency (e.g., in a manner analogous to that described above). However, the OSR corrections can otherwise be determined and/or converted between frequencies.

Transmitting the GNSS corrections S290 preferably functions to provide GNSS corrections to the GNSS receiver (e.g., mobile receiver). The GNSS corrections can be provided over any suitable communication link (e.g., wired or wireless such as internet, satellite, telecommunication, etc.). The GNSS corrections provided to a GNSS receiver are preferably associated with a satellite frequency that the GNSS receiver detects (as shown for example in FIG. 3). For instance, when a GNSS receiver tracks and/or receives satellite observations associated with the first frequency, the GNSS corrections are provided at the first frequency (and similarly for other frequencies). However, the GNSS corrections can be transmitted for a single frequency (e.g., the GNSS receiver, or a processor thereof or collocated therewith can convert the GNSS corrections to a different frequency), GNSS corrections for a plurality of frequencies can be transmitted (where the GNSS receiver can determine the GNSS corrections to be used), and/or any suitable GNSS corrections can be transmitted. The GNSS correction transmission can be mediated by a gateway, router, and/or any suitable communication system (such as a GNSS corrections communication system as disclosed in U.S. patent application Ser. No. 17/379,271 titled 'SYSTEM AND METHOD FOR PROVIDING GNSS CORRECTIONS' filed 19 Jul. 2021 which incorporated is in its entirety by this reference).

Determining the GNSS receiver positioning solution S300 preferably functions to determine (e.g., estimate, calculate, etc.) a kinematic solution (e.g., position, velocity, attitude, time, etc.) of the GNSS receiver. The GNSS receiver positioning solution is preferably determined using a positioning engine (e.g., a positioning engine of a computing system collocated with the GNSS receiver, a cloud positioning engine, etc.), but can be determined by any suitable component. The GNSS receiver positioning solution is preferably determined using satellite observations associated with the second signal frequency (e.g., the signal frequency of satellite observations acquired by the GNSS receiver). However, the GNSS receiver positioning solution can additionally or alternatively be determined using satellite observations associated with the first signal frequency (e.g., the same frequency as satellite observations measured by a reference station), a third signal frequency, a combination of frequencies, and/or any suitable satellite observations can be used.

The GNSS receiver positioning solution is preferably determined using corrected satellite observations (e.g., the GNSS receiver satellite observations received in S100 corrected using the corrections generated in S200). However, the GNSS receiver positioning solution can be determined using any suitable satellite observations (e.g., uncorrected satellite observations; differenced satellite observations such as single differenced satellite observations between receivers, single differenced satellite observations between frequencies, single differenced satellite observations between epochs, single differenced satellite observations between satellites, double-differenced satellite observations between receivers and frequencies, double-differenced satellite observations between receivers and epochs, double-differenced satellite observations between frequencies and epochs, double differenced satellite observations between receivers and satellites, double differenced satellite observations between frequencies and satellites, triple differenced satellite observations between receivers frequencies and epochs, etc.; combined satellite observations such as to form ionosphere-free combinations, geometry-free combination, wide-lane combination, narrow-lane combination, ultra-wide lane combination, Melbourne-Wübbena combination, group and phase ionospheric calibration combination, etc.; etc.). Variants that use single-difference satellite observations (e.g., between satellite-differencing) can provide a technical advantage as these variants will result in code phase bias and/or carrier phase bias offsets (e.g., interfrequency bias, differential code biases) cancelling (or substantially cancelling such as to impact a positioning solution by less than a threshold amount when the interfrequency bias is stable such as less than a threshold fraction of a cycle over time). The satellite observations can be precorrected (e.g., before a filter processes the satellite observations to determine the GNSS receiver positioning solution), corrected in an estimator (such as a Kalman filter, extended Kalman filter, unscented Kalman filter, particle estimator, Gaussian process, etc.; where the GNSS corrections can be an input to the estimator), and/or can otherwise be corrected.

The positioning solution is preferably determined using carrier phase (e.g., ambiguity resolved carrier phase), but can additionally or alternatively be determined using pseudorange, doppler, and/or any suitable satellite signal(s). Determining the positioning solution can include determining the carrier phase ambiguity (e.g., to a floating point precision, to integer precision, etc. such as disclosed in U.S. patent application Ser. No. 16/817,196 filed 12 Mar. 2020 entitled "SYSTEMS AND METHODS FOR REAL TIME KINEMATIC SATELLITE POSITIONING" or in U.S. patent application Ser. No. 17/022,924 filed 16 Sep. 2020 entitled "SYSTEMS AND METHODS FOR HIGH-INTEGRITY SATELLITE POSITIONING," each of which is incorporated in its entirety by this reference), determining a set of floating phase ambiguity hypotheses, determining a set of integer phase ambiguity hypotheses from the set of floating phase ambiguity hypotheses, performing hypothesis testing to validate the set of integer phase ambiguities hypotheses, and/or any suitable steps.

In some variants of S300, the positioning solution can be determined using sensor fusion (e.g., by fusing sensor data with GNSS satellite observations). As a specific example, a sensor fusion system can include: a sensor (e.g., an IMU sensor, accelerometer, gyroscope, magnetometer, visual odometer, wheel tick, steering angle, camera, etc.), a GNSS receiver (e.g., a GNSS antenna), a fusion engine, a sensor engine. The fusion engine preferably functions to determine (e.g., estimate) kinematic parameters of the moving body and/or sensor error correction (e.g., bias estimates, systematic sensor error correction, etc.). The fusion engine can include a filter (e.g., a Kalman filter, extended Kalman filter, unscented Kalman filter, etc.), an error model (e.g., to identify which sensor errors to estimate, how to estimate the sensor errors, etc.), a time synchronizer 248 (e.g., a buffer, which can function to temporally align data streams with different latency), a GNSS positioning engine (e.g., which can function to resolve a carrier phase ambiguity, determine kinematic parameters from the GNSS data, a filter, etc.), and/or any suitable components. The sensor engine preferably functions to determine a kinematic parameter of the moving body based on the sensor data. The sensor engine can include a mechanization model (e.g., built on a physical dynamic model that gets discretized, a set of equations or relationships to determine kinematic parameters from sensor data), an integrator (e.g., a numerical integration model for applying the mechanization model to determine current kinematic parameters from a previous kinematic parameter, to propagate previous kinematic parameters to a current time, etc.), an error compensator (e.g., which can correct sensor measurements for error estimates), a filter (e.g., a Kalman filter, extended Kalman filter, unscented Kalman filter, etc.), and/or any suitable components. However, the sensor fusion system can include any suitable components and/or perform any suitable algorithms to determine the positioning solution (e.g., as disclosed for instance in U.S. patent application Ser. No. 18/073,304 titled 'SYSTEM AND METHOD FOR FUSING DEAD RECKONING AND GNSS DATA STREAMS' filed 1 Dec. 2022 and/or U.S. patent application Ser. No. 18/115,963 titled 'SYSTEM AND METHOD FOR FUSING SENSOR AND SATELLITE MEASUREMENTS FOR POSITIONING DETERMINATION' filed 1 Mar. 2023, each of which is incorporated in its entirety by this reference).

In a specific example, a method can include (and/or a system can be configured to) receiving a set of GNSS satellite signals tracked by GNSS receivers at a plurality of reference stations, where the set of GNSS satellite signals are transmitted with a first signal frequency, where the first set of GNSS satellite signals comprise code phase and carrier phase measurements associated with a plurality of satellites; determining a satellite code bias and a satellite carrier phase bias associated with each satellite of the plurality of satellites based on the first set of GNSS satellite signals; and determining transformed satellite code bias and transformed satellite carrier phase bias by transforming the satellite code bias and the satellite carrier phase bias from the first signal frequency to a second signal frequency that differs from the first signal frequency. In variations of this specific example the first signal frequency and the second signal frequency can be within a common frequency band. In variations of this specific example the first signal frequency can include a carrier frequency of 1176.45 MHz or 1561.098 MHz and wherein the second signal frequency comprises a carrier frequency of 1207.14 MHz or 1575.42 MHz. In variations of this specific example, the positioning solution of the rover comprises a receiver clock state wherein the receiver clock state accounts for a common offset in the satellite carrier bias between satellites. In variations of this specific example, the positioning solution can be determined using differenced satellite observations between satellite signals of the second set of GNSS satellite signals, wherein the differenced satellite signals remove the common offset in the satellite carrier bias between satellites. In variations of this specific example, a deviation (e.g., stability of) between the transformed satellite carrier phase bias and a measured satellite carrier phase bias at the second signal frequency can be at most 0.1 cycles. In variations of this specific example, when the deviation exceeds 0.1 cycles for a satellite, measurements from the satellite can be excluded from the set of corrected satellite signals. In variations of this specific example, determining the transformed satellite code bias and the transformed satellite carrier phase bias can exclude an atmospheric delay contribution to the transformed satellite code bias and the transformed satellite carrier phase bias. In variations of this specific example, the transformed satellite carrier phase bias can be determined according to $$b_{\Phi_{v2}} = b_{\Phi_{v1}} + \frac{f_2 - f_1}{c} b_{P_{v1}},$$

where $b_{\Phi_{v1}}$ is the satellite carrier phase bias at the first signal frequency, $b_{\varphi v2}$ is the transformed satellite carrier phase bias, $f_1$ is the first signal frequency, $f_2$ is second signal frequency, c is the speed of light, and $b_{P_{v1}}$ is the satellite code phase bias; and/or wherein the transformed satellite code phase bias is determined according to: $b_{P_{v2}} = b_{P_{v1}}$, wherein $b_{P_{v2}}$ is the transformed satellite code phase bias. In variations of this specific example, the satellite code bias and the satellite carrier phase bias can be determined using a gaussian process using a squared exponential covariance function.

The methods of the preferred embodiment and variations thereof can be embodied and/or implemented at least in part as a machine configured to receive a computer-readable medium storing computer-readable instructions. The instructions can be executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for correcting global navigation satellite systems (GNSS) signals comprising:
   a processor configured to:
      receive a first set of GNSS satellite observations from satellite signals tracked by GNSS receivers at a plurality of reference stations, wherein the satellite signals are transmitted with a first signal frequency, wherein the first set of GNSS satellite observations comprise code phase and carrier phase measurements associated with a plurality of satellites;
      determine a satellite code bias and a satellite carrier phase bias associated with each satellite of the plurality of satellites based on the first set of GNSS satellite observations;
      determine transformed satellite code bias and transformed satellite carrier phase bias by transforming the satellite code bias and the satellite carrier phase bias from the first signal frequency to a second signal frequency that differs from the first signal frequency; wherein a deviation between the transformed satellite carrier phase bias and a measured satellite carrier phase bias at the second signal frequency is at most 0.1 cycles; and
   a second processor, collocated with a GNSS receiver of a rover, configured to:
      receive a second set of GNSS satellite signals transmitted at the second signal frequency; and
      determine a positioning solution of the rover using a set of corrected GNSS satellite signals formed by correcting the second set of GNSS satellite signals using the transformed satellite code bias and the transformed satellite carrier phase bias.

2. The system of claim 1, wherein the first signal frequency and the second signal frequency are within a common frequency band.

3. The system of claim 1, wherein the first signal frequency comprises a carrier frequency of 1176.45 MHz or 1561.098 MHz and wherein the second signal frequency comprises a carrier frequency of 1207.14 MHz or 1575.42 MHz.

4. The system of claim 1, wherein the positioning solution of the rover comprises a receiver clock state wherein the receiver clock state accounts for a common offset in the satellite carrier phase bias between satellites.

5. The system of claim 4, wherein the positioning solution is determined using differenced satellite signals between satellite signals of the second set of GNSS satellite signals, wherein the differenced satellite signals remove the common offset in the satellite carrier phase bias between satellites.

6. The system of claim 1, wherein when the deviation exceeds 0.1 cycles for a satellite, measurements from the satellite are excluded from the set of corrected satellite signals.

7. The system of claim 1, wherein determining the transformed satellite code bias and the transformed satellite carrier phase bias excludes an atmospheric delay contribution to the transformed satellite code bias and the transformed satellite carrier phase bias.

8. The system of claim 1, wherein the transformed satellite carrier phase bias is determined according to $$b_{\Phi_{v2}} = b_{\Phi_{v1}} + \frac{f_2 - f_1}{c} b_{P_{v1}},$$

where $b_{\Phi_{v1}}$ is the satellite carrier phase bias at the first signal frequency, $b_{\Phi_{v2}}$ is the transformed satellite carrier phase bias, $f_2$ is second signal frequency, $f_1$ is the first signal frequency, c is the speed of light, and $b_{P_{v1}}$ is the satellite code phase bias; and
   wherein the transformed satellite code phase bias is determined according to: $b_{P_{v2}} = b_{P_{v1}}$, wherein $b_{P_{v2}}$ is the transformed satellite code phase bias.

9. The system of claim 1, wherein determining the positioning solution of the rover comprises:
   determining a set of carrier phase ambiguity hypothesis hypotheses for each satellite signal of the second set of GNSS satellite signals; and
   selecting a carrier phase ambiguity of the set of carrier phase ambiguity hypotheses based on results of a hypothesis test comparing carrier phase ambiguities of the set of carrier phase ambiguity hypotheses;
wherein the positioning solution is determined using the carrier phase measurements of the second set of GNSS satellite signals based on the selected carrier phase ambiguities.

10. A method comprising:
   receiving a set of GNSS satellite signals tracked by GNSS receivers at a plurality of reference stations, wherein the set of GNSS satellite signals are transmitted with a first signal frequency, wherein the first set of GNSS satellite signals comprise code phase and carrier phase measurements associated with a plurality of satellites;

determining a satellite code bias and a satellite carrier phase bias associated with each satellite of the plurality of satellites based on the first set of GNSS satellite signals; and determining transformed satellite code bias and transformed satellite carrier phase bias by transforming the satellite code bias and the satellite carrier phase bias from the first signal frequency to a second signal frequency that differs from the first signal frequency; wherein the transformed satellite carrier phase bias is determined according to $$b_{\Phi_{v2}} = b_{\Phi_{v1}} + \frac{f_2 - f_1}{c} b_{P_{v1}},$$

where $b_{\Phi_{v1}}$ is the satellite carrier phase bias at the first signal frequency, $b_{\Phi_{v2}}$ is the transformed satellite carrier phase bias, $f_2$ is second signal frequency, $f_1$ is the first signal frequency, c is the speed of light, and $b_{P_{v1}}$ is the satellite code phase bias; and wherein the transformed satellite code phase bias is determined according to: $b_{P_{v2}} = b_{P_{v1}}$, wherein $b_{P_{v2}}$ is the transformed satellite code phase bias.

11. The method of claim 10, wherein the first signal frequency and the second signal frequency are within a common frequency band.

12. The method of claim 10, wherein the first signal frequency comprises a carrier frequency of 1176.45 MHz or 1561.098 MHz and wherein the second signal frequency comprises a carrier frequency of 1207.14 MHz or 1575.42 MHz.

13. The method of claim 10, further comprising determining a positioning solution of a rover, wherein the positioning solution of the rover comprises a receiver clock state wherein the receiver clock state accounts for a common offset in the satellite carrier phase bias between satellites.

14. The method of claim 13, wherein the positioning solution is determined using differenced satellite signals, wherein the differenced satellite signals remove the common offset in the satellite carrier phase bias between satellites.

15. The method of claim 10, wherein a deviation between the transformed satellite carrier phase bias and a measured satellite carrier phase bias at the second signal frequency is at most 0.1 cycles.

16. The method of claim 15, wherein when the deviation exceeds 0.1 cycles for a satellite, measurements from the satellite are excluded from the set of corrected satellite signals.

17. The method of claim 10, wherein determining the transformed satellite code bias and the transformed satellite carrier phase bias excludes an atmospheric delay contribution to the transformed satellite code bias and the transformed satellite carrier phase bias.

18. The method of claim 10, wherein the satellite code bias and the satellite carrier phase bias are determined using a gaussian process using a squared exponential covariance function.

19. A method comprising:

receiving a set of GNSS satellite signals tracked by GNSS receivers at a plurality of reference stations, wherein the set of GNSS satellite signals are transmitted with a first signal frequency, wherein the first set of GNSS satellite signals comprise code phase and carrier phase measurements associated with a plurality of satellites;

determining a satellite code bias and a satellite carrier phase bias associated with each satellite of the plurality of satellites based on the first set of GNSS satellite signals, wherein the satellite code bias and the satellite carrier phase bias are determined using a gaussian process using a squared exponential covariance function; and determining transformed satellite code bias and transformed satellite carrier phase bias by transforming the satellite code bias and the satellite carrier phase bias from the first signal frequency to a second signal frequency that differs from the first signal frequency.

20. The method of claim 19, wherein a deviation between the transformed satellite carrier phase bias and a measured satellite carrier phase bias at the second signal frequency is at most 0.1 cycles.

21. The method of claim 20, wherein when the deviation exceeds 0.1 cycles for a satellite, measurements from the satellite are excluded from the set of corrected satellite signals.

22. The method of claim 19, wherein determining the transformed satellite code bias and the transformed satellite carrier phase bias excludes an atmospheric delay contribution to the transformed satellite code bias and the transformed satellite carrier phase bias.

23. The method of claim 19, wherein the first signal frequency and the second signal frequency are within a common frequency band.

* * * * *

UNITED STATES PATENT AND TRADEMARK OFFICE
CERTIFICATE OF CORRECTION

PATENT NO. : 12,013,468 B2
APPLICATION NO. : 18/241542
DATED : June 18, 2024
INVENTOR(S) : Ivan Smolyakov, Sébastien Carcanague and Joseph Angelo Page 1 of 1

It is certified that error appears in the above-identified patent and that said Letters Patent is hereby corrected as shown below:

In the Claims

Column 20, Line 43, In Claim 8, delete "$b_{P_{v1}}$," and insert -- $b_{P_{v1}}$ -- therefore Column 20, Line 50, In Claim 9, after "ambiguity", delete "hypothesis"

Signed and Sealed this
Thirtieth Day of July, 2024

Katherine Kelly Vidal
*Director of the United States Patent and Trademark Office*